US012719587B2

(12) United States Patent
Meng et al.

(10) Patent No.: US 12,719,587 B2
(45) Date of Patent: Aug. 25, 2026

(54) OPTICALLY COUPLED MULTI-NODE COMPUTING SYSTEM

(71) Applicant: SHANGHAI XIZHI TECHNOLOGY CO., LTD., Shanghai (CN)

(72) Inventors: Huaiyu Meng, Medford, MA (US); Yichen Shen, Cambridge, MA (US); Cheng-Kuan Lu, Littleton, MA (US); Yelong Xu, Allston, MA (US)

(73) Assignee: SHANGHAI XIZHI TECHNOLOGY CO., LTD., Shanghai (CN)

( * ) Notice: Subject to any disclaimer, the term of this patent is extended or adjusted under 35 U.S.C. 154(b) by 267 days.

(21) Appl. No.: 18/688,283

(22) PCT Filed: Sep. 6, 2021

(86) PCT No.: PCT/CN2021/116698

§ 371 (c)(1),
(2) Date: Feb. 29, 2024

(87) PCT Pub. No.: WO2023/029042

PCT Pub. Date: Mar. 9, 2023

(65) Prior Publication Data

US 2025/0132842 A1 Apr. 24, 2025

(51) Int. Cl.
*H04B 10/80* (2013.01)
*H04B 10/27* (2013.01)
*H04B 10/50* (2013.01)

(52) U.S. Cl.
CPC ........... *H04B 10/801* (2013.01); *H04B 10/27* (2013.01); *H04B 10/506* (2013.01)

(58) Field of Classification Search
CPC ........ H04B 17/10; H04B 17/20; H04B 17/30; H04B 15/02; H04B 14/02; H04B 13/02;
(Continued)

(56) References Cited

U.S. PATENT DOCUMENTS 5,903,371 A * 5/1999 Arecco ............... H04J 14/0241 398/4
6,324,204 B1 * 11/2001 Deacon ................... H01S 5/141 372/20

(Continued)

OTHER PUBLICATIONS

Pranay Koka et al., “Silicon-Photonic Network Architectures for Scalable, Power-Efficient Multi-Chip Systems,” Jun. 19, 2010, ACM SIGARCH Computer Architecture News, vol. 38, Issue 3, ISCA’10, Jun. 19-23, 2010, Saint-Malo, France, pp. 117-123.*

(Continued)

*Primary Examiner* — Omar S Ismail
(74) *Attorney, Agent, or Firm* — VOLPE KOENIG

(57) ABSTRACT

An apparatus includes a plurality of nodes coupled to an optical network, each node including an optical transmitter interface configured to transmit an optical signal at a location along a coupled optical path of the optical network, and an optical receiver interface configured to receive an optical signal at a location along the coupled optical path of the optical network. The apparatus includes a first optical path of the optical network configured to propagate a guided mode around a closed path; and a second optical path of the optical network configured to propagate a guided mode around a closed path.

20 Claims, 18 Drawing Sheets

(58) Field of Classification Search
CPC ........ H04B 10/80; H04B 10/60; H04B 10/50; H04B 10/40; H04B 10/29; H04B 10/25; H04B 10/27; H04B 10/11; H04B 10/07; H04B 10/03; H04B 7/24; H04B 7/14; H04B 7/02; H04B 5/70; H04B 5/40; H04B 5/20; H04B 3/54; H04B 3/02; H04B 1/69; H04B 1/62; H04B 1/38; H04B 1/3816; H04B 1/40; H04B 1/3827; H04B 1/06; H04B 1/10; H04B 1/16; H04B 1/03; H04B 1/02
See application file for complete search history.

(56) References Cited

U.S. PATENT DOCUMENTS 11,042,416 B2* 6/2021 Patil ..................... G06F 9/5027
11,122,347 B2* 9/2021 Willcock .......... H04Q 11/0005
2005/0022046 A1* 1/2005 Cheng ................... H04L 1/0041 714/4.2
2005/0147365 A1* 7/2005 Benner ................ G02B 6/2848 385/115
2005/0172244 A1* 8/2005 Meyer ..................... G06F 30/30 716/108
2008/0240214 A1* 10/2008 Dapper ............... H04L 27/2614 375/222
2010/0239266 A1* 9/2010 Kash ................. H04Q 11/0005 398/140
2010/0265963 A1* 10/2010 Patenaude ............. H04J 3/1611 370/404
2010/0266276 A1* 10/2010 Zheng .................. G02B 6/2804 398/43
2011/0103790 A1* 5/2011 Palacharla .......... H04J 14/0284 398/58
2012/0033968 A1* 2/2012 Testa ................... H04J 14/0212 398/52
2012/0062974 A1* 3/2012 Manipatruni ........... G02F 1/011 438/54
2012/0163749 A1* 6/2012 Huang ............... G02B 6/12004 385/2
2012/0213516 A1* 8/2012 Mukherjee .......... H04J 14/0267 398/45
2015/0010307 A1* 1/2015 Zhong .................. H04B 10/272 398/68
2015/0131989 A1* 5/2015 Syed .................. H04Q 11/0066 398/45
2015/0131997 A1* 5/2015 Syed ................... H04J 14/0256 398/69
2015/0188624 A1* 7/2015 Syed ....................... H04L 45/22 398/5
2016/0182154 A1* 6/2016 Fang .................. H04B 10/2575 398/116
2016/0337041 A1* 11/2016 Wen ................... H04B 10/2575
2017/0078015 A1* 3/2017 Ratterree ............... H04B 10/03
2017/0237492 A1* 8/2017 Mutalik ........... H04B 10/25751 398/72
2017/0295090 A1* 10/2017 Gopalan ................. H04L 45/28
2018/0267236 A1* 9/2018 Heroux ................ G02B 6/4215
2019/0109638 A1* 4/2019 Yilmaz ............. H04B 10/0791
2020/0011903 A1* 1/2020 Menzel ................ G01R 19/003
2020/0018701 A1* 1/2020 Meyer ................... G01J 3/0259
2020/0192035 A1* 6/2020 Leigh ................... G02B 6/4415
2020/0336807 A1 10/2020 Wang et al.
2021/0152902 A1* 5/2021 Veguru ............... H04J 14/0298
2021/0167850 A1* 6/2021 Schmogrow ........... H04B 10/25
2021/0167851 A1* 6/2021 Xiao ...................... H04B 10/25
2021/0201126 A1* 7/2021 Meng ................... G06N 3/0464
2021/0258078 A1* 8/2021 Meade ................ G11C 11/4096
2021/0341765 A1* 11/2021 Lu ........................ G06N 3/0675
2021/0384998 A1* 12/2021 Mula ..................... H04J 3/0697
2022/0173825 A1* 6/2022 Ramini ................ H04B 10/801
2023/0353911 A1* 11/2023 White ................ H04Q 11/0062

OTHER PUBLICATIONS

Assaf Shacham et al.," Photonic Networks-on-Chip for Future Generations of Chip Multiprocessors," Apr. 28, 2008, IEEE Transactions on Computers, vol. 57, No. 9, Sep. 2008, pp. 1246-1255.*
Alan R. Mickelson,"Silicon Photonics for On-Chip Interconnections," Oct. 20, 2011, 2011 IEEE Custom Integrated Circuits Conference (CICC), pp. 1-6.*
Theonitsa Alexoudi et al., "Optics in Computing: From Photonic Network-on-Chip to Chip-to-Chip Interconnects and Disintegrated Architectures," Oct. 15, 2018, Journal of Lightwave Technology, vol. 37, No. 2, Jan. 15, 2019, pp. 363-375.*
Ashok V. Krishnamoorthy et al., "From Chip to Cloud: Optical Interconnects in Engineered Systems," Dec. 20, 2016, Journal of Lightwave Technology, vol. 35, No. 15, Aug. 1, 2017, pp. 3103-3112.*
Aleksandr Biberman et al., "Optical interconnection networks for high-performance computing systems," Mar. 13, 2012, Reports on Progress in Physics, 75 (2012) 046402, pp. 1-12.*
Sai Vineel Reddy Chittamuru et al., "BiGNOC: Accelerating Big Data Computing with Application-Specific Photonic Network-on-Chip Architectures," May 8, 2018, IEEE Transactions on Parallel and Distributed Systems, vol. 29, No. 11, Nov. 2018, pp. 2402-2409.*
Johnnie Chan et al., "Architectural Exploration of Chip-Scale Photonic Interconnection Network Designs Using Physical-Layer Analysis, "Apr. 7, 2010, Journal of Lightwave Technology, vol. 28, No. 9, May 1, 2010, pp. 1305-1310.*
Keren Bergman et al., " Photonic Network on-Chip Design," 2014, Book—Integrated Circuits and Systems, vol. 68, pp. 42-62,109-129, 170-185.*

* cited by examiner

900

| | chip1 | chip2 | chip3 | chip4 | chip5 |
|---|---|---|---|---|---|
| wavelength 1 | 1 | 0.7 | 0.49 | 0.343 | 0.2401 |
| wavelength 2 | 0.2401 | 1 | 0.7 | 0.49 | 0.343 |
| wavelength 3 | 0.343 | 0.2401 | 1 | 0.7 | 0.49 |
| wavelength 4 | 0.49 | 0.343 | 0.2401 | 1 | 0.7 |
| wavelength 5 | 0.7 | 0.49 | 0.343 | 0.2401 | 1 |
| | | | | | |
| | | | | | |
| directional coupler ratio | 0.3 | | | | |

| | | | Normalized | |
|---|---|---|---|---|
| PAM4 value | RX0 | RX1 | RX0 | RX1 |
| 11 | 1.043 | 0.7301 | 1 | 1 |
| 10 | 0.7 | 0.49 | 0.671141 | 0.671141 |
| 01 | 0.343 | 0.2401 | 0.328859 | 0.328859 |
| 00 | 0 | 0 | 0 | 0 |

| | chip1 | | chip2 | | chip3 | | chip4 | | Chip5 | |
|---|---|---|---|---|---|---|---|---|---|---|
| PAM4 receiver | RX0 | RX1 | RX0 | RX1 | RX0 | RX1 | RX0 | RX1 | RX0 | RX1 |
| 11 | WL3 + WL5 | WL2 + WL4 | WL1 + WL4 | WL5 + WL3 | WL2 + WL5 | WL1 + WL4 | WL3 + WL1 | WL2 + WL5 | WL4 + WL2 | WL3 + WL1 |
| 10 | WL5 | WL4 | WL1 | WL5 | WL2 | WL1 | WL3 | WL2 | WL4 | WL3 |
| 01 | WL3 | WL2 | WL4 | WL3 | WL5 | WL4 | WL1 | WL5 | WL2 | WL1 |
| 00 | | | | | | | | | | |

FIG. 9C

OPTICALLY COUPLED MULTI-NODE COMPUTING SYSTEM

TECHNICAL FIELD

This disclosure relates to an optically coupled multi-node computing system.

BACKGROUND

Optical signals have been used for transporting data, over long distances, and over shorter distances, including within data centers, and within individual optical devices. An example of optical networking within a device is an optical network on a chip (ONoC). There are also various topologies of optical networks that are used to connect nodes of a system.

SUMMARY

In a general aspect, an apparatus includes: an integrated circuit including a plurality of nodes coupled to an optical network, each node including an optical transmitter interface configured to transmit an optical signal at a location along a coupled optical path of the optical network, and an optical receiver interface configured to receive an optical signal at a location along the coupled optical path of the optical network. The apparatus includes a first optical path of the optical network including at least a portion fabricated in at least one layer of the integrated circuit and configured to propagate a guided mode around a closed path; and a second optical path of the optical network including at least a portion fabricated in at least one layer of the integrated circuit and configured to propagate a guided mode around a closed path. The first and second optical paths overlap with each other at a first set of four locations on the integrated circuit. The first optical path is coupled to two or more of the plurality of nodes at a second set of respective locations on the integrated circuit different from all of the locations in the first set of locations. The second optical path is coupled to two or more of the plurality of nodes at a third set of respective locations on the integrated circuit different from all of the locations in the first and second sets of locations.

Implementations can include one or more of the following features. The first optical path can include at least first and second straight segments that are parallel to each other, with at least one of the plurality of nodes coupled at two or more locations in the second set along the first straight segment and at least one of the plurality of nodes coupled at two or more locations in the second set along the second straight segment.

The first and second optical paths can overlap with each other at the first set of four locations without switching optical signals between the first and second optical paths at any of the four locations in the first set.

At at least one of the four locations in the first set, a portion of the first optical path in a first layer of the integrated circuit can overlap with a portion of the second optical path in a second layer of the integrated circuit.

At at least one location on the integrated circuit, a portion of the second optical path can be in the first layer of the integrated circuit.

At least one of the plurality of nodes can be coupled to the first optical path at one or more locations in the second set of locations and is coupled to the second optical path at one or more locations in the third set of locations.

The first and second optical paths can overlap with each other with at least one switch configured to switch optical signals between the first and second optical paths at at least one of the four locations in the first set.

The first and second optical paths can be fabricated in the same layer of the integrated circuit.

The switch can include at least two waveguide ring resonators in proximity to one of the four locations in the first set at which the first and second optical paths overlap with each other.

The apparatus can further include: a third optical path of the optical network including at least a portion fabricated in at least one layer of the integrated circuit and configured to propagate a guided mode around a closed path; and a fourth optical path of the optical network including at least a portion fabricated in at least one layer of the integrated circuit and configured to propagate a guided mode around a closed path. The third and fourth optical paths can overlap with each other at a fourth set of four locations on the integrated circuit. The third optical path can be coupled to two or more of the plurality of nodes at a fifth set of respective locations on the integrated circuit different from all of the locations in the first, second, third, and fourth sets of locations. The fourth optical path can be coupled to two or more of the plurality of nodes at a sixth set of respective locations on the integrated circuit different from all of the locations in the first, second, third, fourth, and fifth sets of locations.

The integrated circuit can be a first integrated circuit, and the apparatus can include a second integrated circuit including a plurality of nodes coupled to the optical network.

The first optical path of the optical network can include at least a portion fabricated in at least one layer of the second integrated circuit.

The apparatus can include a third integrated circuit including a plurality of nodes coupled to the optical network.

The second optical path of the optical network can include at least a portion fabricated in at least one layer of the third integrated circuit.

At least one of the plurality of nodes coupled to the first optical path can be configured to transmit optical signals using a first optical wavelength, and at least one of the plurality of nodes coupled to the first optical path can be configured to transmit optical signals using a second optical wavelength different from the first optical wavelength.

The apparatus can include a controller configured to schedule the transmission of optical signals among the nodes, in which the controller can be configured to set a first node as a transmitter during a first time period, and prevent the other nodes from transmitting signals on the optical path coupled to the first node during the first time period.

Each of at least some of the nodes can include at least one of a central processing unit, a graphics processor unit, a tensor processing unit, a digital signal processor, or a matrix processor.

In another general aspect, an apparatus includes: a plurality of nodes coupled to an optical network, each node including an optical transmitter interface configured to transmit an optical signal at a location along a coupled optical path of the optical network, and an optical receiver interface configured to receive an optical signal at a location along the coupled optical path of the optical network. The apparatus includes a first optical path of the optical network configured to propagate a guided mode around a closed path; and a second optical path of the optical network configured to propagate a guided mode around a closed path. The first and second optical paths can overlap with each other at a first set of four locations, the first optical path can be coupled to two or more of the nodes at a second set of respective locations different from the locations in the first set of locations, and the second optical path can be coupled to two or more of the nodes at a third set of respective locations different from all of the locations in the first and second sets of locations.

The first and second optical paths can overlap with each other at the first set of four locations without switching optical signals between the first and second optical paths at any of the four locations in the first set.

The first and second optical paths can overlap with each other with at least one switch configured to switch optical signals between the first and second optical paths at at least one of the four locations in the first set.

The nodes, the first optical path, and the second optical path can be disposed on a single substrate.

Each of at least some of the nodes can include an integrated circuit.

The apparatus can include an integrated circuit, in which the nodes are part of the integrated circuit.

The first optical path and the second optical path can include planar waveguides formed on the single substrate.

A first subset of the nodes, a first portion of the first optical path, and a first portion of the second optical path can be disposed on a first substrate. A second subset of the nodes, a second portion of the first optical path, and a second portion of the second optical path can be disposed on a second substrate.

At least a portion of the first optical path can include a planar waveguide formed on a substrate.

At least a portion of the second optical path can include a planar waveguide formed on a substrate.

In another general aspect, an apparatus includes: an array of nodes; and an optical network including a first optical path and a second optical path. The first optical path is configured to propagate a guided mode around a first closed path, and the first optical path is optically coupled to a plurality of the nodes in the array. The second optical path is configured to propagate a guided mode around a second closed path, and the second optical path optically coupled to a plurality of the nodes in the array. The optical network is configured such that no switch is provided between the first and second optical paths such that an optical signal traveling in the first optical path remains in the first optical path and is not switched to the second optical path, and an optical signal traveling in the second optical path remains in the second optical path and is not switched to the first optical path. The apparatus includes a controller configured to schedule transmission of optical signals among the nodes through the optical network.

Implementations can include one or more of the following features. The first optical path can be optically coupled to all of the nodes in the array, and the second optical path is optically coupled to all of the nodes in the array.

The controller can be configured to set a first node as a transmitter during a first time period, the first node can be configured to transmit an optical signal on the first optical path during the first time period, and the controller can be configured to prevent the other nodes from transmitting signals on the first optical path during the first time period.

The controller can be configured to set a second node as a transmitter during the first time period, the second node can be configured to transmit an optical signal on the second optical path during the first time period, and the controller can be configured to prevent the other nodes from transmitting signals on the second optical path during the first time period.

The array of nodes can include rows of nodes and columns of nodes. The first optical path can include one or more waveguide sections that extend in the row direction and are optically coupled to the plurality of nodes, and the second optical path can include one or more waveguide sections that extend in the column direction and are optically coupled to the plurality of nodes.

The first optical path can include a waveguide section that is positioned between N-th and (N+1)-th rows of nodes, and can be optically coupled to all of the nodes in the N-th and (N+1)-th rows, and N is an integer that is equal to or greater than 1.

The second optical path can include a waveguide section that is positioned between M-th and (M+1)-th columns of nodes, and can be optically coupled to all of the nodes in the M-th and (M+1)-th columns, and M is an integer that is equal to or greater than 1.

Each of at least some of the nodes can include at least one of a central processing unit, a graphics processor unit, a tensor processing unit, a digital signal processor, or a matrix processor.

In another general aspect, an apparatus includes: a plurality of nodes; and an optical network including a first optical path and a second optical path. The first optical path is configured to propagate a guided mode around a first closed path, and the first optical path is optically coupled to a plurality of the nodes in the array. The second optical path is configured to propagate a guided mode around a second closed path, and the second optical path optically coupled to a plurality of the nodes in the array. The first and second optical paths overlap with each other at a first set of at least two locations, the first optical path is coupled to two or more of the nodes at a second set of respective locations different from the locations in the first set of locations, and the second optical path is coupled to two or more of the nodes at a third set of respective locations different from all of the locations in the first and second sets of locations.

Implementations can include one or more of the following features. The apparatus can include a controller configured to schedule transmission of optical signals among the nodes through the optical network. The controller can be configured to set a first node as a transmitter and set a first switch to be at a pass state or a switch state during a first time period. The first node can be configured to transmit an optical signal via the first switch through the first optical path during the first time period, and the controller can be configured to prevent the other nodes from transmitting signals on the first optical path during the first time period.

A first node can be configured to transmit an optical signal at a first wavelength around the first optical path in a first direction, and at least one node coupled to the optical network can be configured to couple substantially all remaining optical power at the first wavelength from the first optical path preventing interference with the optical signal at the first wavelength transmitted by the first node.

A first node can include an optical transmitter interface and an optical receiver interface. The optical transmitter interface can be configured to transmit a first optical signal along a portion of the first closed path at a first wavelength, and transmit a second optical signal along a portion of the first closed path at a second wavelength. The optical receiver interface can be configured to receive an optical signal from a location along the first closed path at a third wavelength.

A second node can include an optical transmitter interface and an optical receiver interface. The optical transmitter interface can be configured to transmit an optical signal along a portion of the first closed path at the third wavelength, and configured to transmit an optical signal along a portion of the first closed path at the second wavelength. The optical receiver interface can be configured to receive an optical signal from a location along the first closed path at the first wavelength.

The third node can include an optical transmitter interface and an optical receiver interface. The optical transmitter interface can be configured to transmit an optical signal onto the first closed path at the first wavelength, and configured to transmit an optical signal onto the first closed path at the third wavelength. The optical receiver interface can be configured to receive an optical signal from a location along the first closed path at the second wavelength.

The plurality of nodes can include at least a first node, a second node, and a third node coupled to the first closed path. The plurality of nodes can be configured to communicate over the first optical network using a plurality of wavelengths including at least a first wavelength, a second wavelength, and a third wavelength.

The first node can include: an optical transmitter interface configured to transmit a first optical signal at the first wavelength onto the first closed path, an optical receiver interface configured to simultaneously detect from the first closed path a second optical signal at a second wavelength and a third optical signal at a third wavelength, and demodulation circuitry coupled to the optical receiver interface of the first node. The demodulation circuitry can be configured to determine, for a plurality of time slots, a mapping between a plurality of amplitude levels detected during the time slots and binary symbols modulated onto each of the second optical signal and third optical signal.

The second node can include: an optical transmitter interface configured to transmit the second optical signal onto the first closed path, an optical receiver interface configured to simultaneously detect from the first closed path a plurality of optical signals at respective wavelengths different from the second wavelength, and demodulation circuitry coupled to the optical receiver interface of the second node. The demodulation circuitry can be configured to determine, for a plurality of time slots, a mapping between a plurality of amplitude levels detected during the time slots and binary symbols modulated onto each of the plurality of optical signals detected by the optical receiver interface of the second node.

In another general aspect, an apparatus includes: an array of nodes; and an optical network including a first optical loop and a second optical loop, in which the first optical loop is optically coupled to all of the nodes in the array, and the second optical loop is optically coupled to all of the nodes in the array. The apparatus includes a controller configured to schedule transmission of optical signals among the nodes through the optical network. The controller is configured to permit only one node to broadcast an optical signal through the first optical loop during a first time period, prevent the other nodes from transmitting optical signals on the first optical loop during the first time period, permit only one node to broadcast an optical signal through the second optical loop during a second time period, and prevent the other nodes from transmitting optical signals on the second optical loop during the second time period.

The controller can be configured to schedule a first node and a second node to communicate with each other through the first optical loop during a third time period, schedule a third node and a fourth node to communicate with each other through the second optical loop during the third time period, and prevent the other nodes from transmitting optical signals on the first and second optical loops during the third time period.

For example, no switch is provided between the first and second optical loops such that an optical signal traveling in the first optical loop remains in the first optical loop and is not switched to the second optical loop, and an optical signal traveling in the second optical loop remains in the second optical loop and is not switched to the first optical loop; and transmission of optical signals among the nodes through the optical network.

Each node can include: an optical transmitter interface configured to transmit an optical signal at a first location along the first or second optical loop, and an optical receiver interface configured to receive an optical signal at a second location along the first or second optical loop. The first and second optical loops can overlap with each other at a first set of four locations, the first optical loop can be coupled to two or more of the nodes at a second set of respective locations different from all of the locations in the first set of locations, and the second optical loop can be coupled to two or more of the plurality of nodes at a third set of respective locations different from all of the locations in the first and second sets of locations.

Each of at least some of the nodes can include at least one of a central processing unit, a graphics processor unit, a tensor processing unit, a digital signal processor, or a matrix processor.

In another general aspect, an apparatus includes: an array of four rows and four columns of nodes, a first optical loop, and a second optical loop. The first optical loop includes a first optical path section positioned between a first row and a second row, and a second optical path section positioned between a third row and a fourth row. The second optical loop includes a third optical path section positioned between a first column and a second column, and a fourth optical path section positioned between a third column and a fourth column. Every node in the first and second rows are optically coupled to the first optical path section, every node in the third and fourth rows are optically coupled to the second optical path section, every node in the first and second columns are optically coupled to the third optical path section, and every node in the third and fourth columns are optically coupled to the fourth optical path section.

In another general aspect, a method includes: transmitting an optical signal from a first node to a second node through an optical network. Each node includes an optical transmitter interface configured to transmit an optical signal at a location along a coupled optical path of the optical network, and an optical receiver interface configured to receive an optical signal at a location along the coupled optical path of the optical network. The method includes: propagating a guide mode around a closed path of a first optical path of the optical network; and propagating a guided mode around a closed path of a second optical path of the optical network. The first and second optical paths overlap with each other at a first set of four locations, the first optical path is coupled to two or more of the nodes at a second set of respective locations different from the locations in the first set of locations, and the second optical path is coupled to two or more of the nodes at a third set of respective locations different from all of the locations in the first and second sets of locations.

In another general aspect, an apparatus includes: an integrated circuit including one or more nodes coupled to an optical network, and a first optical path of the optical network. A first node of the one or more nodes includes: an optical transmitter interface configured to transmit an optical signal at a first location along a coupled optical path of the optical network, and an optical receiver interface configured to receive an optical signal at a second location along the coupled optical path of the optical network. The first optical path of the optical network includes at least a portion fabricated in at least one layer of the integrated circuit and configured to propagate a guided mode around a closed path. The optical transmitter interface in the first node is configured to transmit an optical signal at a first wavelength around the first optical path in a first direction. At least one node coupled to the optical network is configured to couple substantially all remaining optical power at the first wavelength from the first optical path preventing interference with the optical signal at the first wavelength transmitted by the optical transmitter interface of the first node.

Implementations can include one or more of the following features. The node coupled to the optical network that is configured to couple substantially all remaining optical power at the first wavelength from the first optical path can include the first node.

The optical transmitter interface in the first node can include an optical source that is coupled to the first optical path through an optical structure that transmits the optical signal at the first wavelength from the optical source to the first location.

The optical transmitter interface of the first node can include an optical power terminating structure that receives substantially all remaining optical power at the first wavelength coupled from the first optical path at the first location through the optical structure.

The optical structure can include at least two ring resonators with the optical signal at the first wavelength and the remaining optical power propagating around each of the ring resonators in opposite directions.

The optical receiver interface can include an optical splitter that is configured to couple a fraction of optical power propagating past the second location to one or more detectors.

The one or more detectors include a plurality of detectors, and the optical receiver interface includes optical structures configured to couple optical power at different wavelengths to different respective detectors of the plurality of detectors.

The node coupled to the optical network that is configured to couple substantially all remaining optical power at the first wavelength from the first optical path can include a second node of the one or more nodes on the integrated circuit.

The second node can include: an optical transmitter interface configured to transmit an optical signal at a third location along a coupled optical path of the optical network, and an optical receiver interface configured to receive an optical signal at a fourth location along the coupled optical path of the optical network.

The optical receiver interface in the second node can be configured to couple substantially all remaining optical power at the first wavelength from the first optical path.

The node coupled to the optical network that is configured to couple substantially all remaining optical power at the first wavelength from the first optical path can include a node outside of the integrated circuit In another general aspect, an apparatus includes: a plurality of nodes coupled to an optical network, and a first optical path of the optical network configured to propagate a guided mode around a closed path. A first node of the plurality of nodes includes: an optical transmitter interface configured to transmit an optical signal at a first location along a coupled optical path of the optical network, and an optical receiver interface configured to receive an optical signal at a second location along the coupled optical path of the optical network. The optical transmitter interface in the first node is configured to transmit an optical signal at a first wavelength around the first optical path in a first direction. At least one node coupled to the optical network is configured to couple substantially all remaining optical power at the first wavelength from the first optical path preventing interference with the optical signal at the first wavelength transmitted by the optical transmitter interface of the first node.

Implementations can include one or more of the following features. The nodes and the first optical path can be disposed on a single substrate.

Each of at least some of the nodes can include an integrated circuit.

The apparatus can include an integrated circuit, in which the nodes are part of the integrated circuit.

The first optical path can include a planar waveguide formed on the single substrate.

A first subset of the nodes and a first portion of the first optical path can be disposed on a first substrate, and a second subset of the nodes and a second portion of the first optical path can be disposed on a second substrate.

In another general aspect, a method includes transmitting an optical signal at a first wavelength from a first node to a second node through an optical network that includes a first optical path configured to propagate a guided mode around a closed path. The first node is configured to transmit the optical signal around the first optical path in a first direction. At at least one node coupled to the optical network, coupling substantially all remaining optical power at the first wavelength from the first optical path preventing interference with the optical signal at the first wavelength transmitted by the first node.

Implementations can include one or more of the following features. The at least one node coupled to the optical network that is configured to couple substantially all remaining optical power at the first wavelength from the first optical path can include the first node.

In another general aspect, an apparatus includes: a first optical network configured to propagate a guided mode around a first closed path; and at least a first node, a second node, and a third node coupled to the first closed path. The first node includes: an optical transmitter interface configured to transmit an optical signal along a portion of the first closed path to the second node at a first wavelength, and configured to transmit an optical signal along a portion of the first closed path to the third node at a second wavelength, and an optical receiver interface configured to receive an optical signal from a location along the first closed path at a third wavelength. The second node includes: an optical transmitter interface configured to transmit an optical signal along a portion of the first closed path to the first node at the third wavelength, and configured to transmit an optical signal along a portion of the first closed path to the third node at the second wavelength, and an optical receiver interface configured to receive an optical signal from a location along the first closed path at the first wavelength. The third node includes: an optical transmitter interface configured to transmit an optical signal onto the first closed path at the first wavelength, and configured to transmit an optical signal onto the first closed path at the third wavelength, and an optical receiver interface configured to receive an optical signal from a location along the first closed path at the second wavelength.

Implementations can include one or more of the following features. The apparatus can further include a second optical network configured to propagate a guided mode around a second closed path, in which the third node is coupled to the second closed path.

The apparatus can further include a fourth node coupled to the second closed path.

The apparatus can further include a third optical network configured to propagate a guided mode around a third closed path, wherein the fourth node is coupled to the third closed path.

The apparatus can further include at least a fifth node and a sixth node coupled to the third closed path.

The fifth node can include: an optical transmitter interface configured to transmit an optical signal along a portion of the third closed path to the sixth node at the second wavelength, and configured to transmit an optical signal along a portion of the third closed path to the fourth node at the third wavelength, and an optical receiver interface configured to receive an optical signal from a location along the third closed path at the first wavelength. The sixth node can include: an optical transmitter interface configured to transmit an optical signal along a portion of the third closed path to the fifth node at the first wavelength, and configured to transmit an optical signal along a portion of the third closed path to the fourth node at the third wavelength, and an optical receiver interface configured to receive an optical signal from a location along the third closed path at the second wavelength. The fourth node can include: an optical transmitter interface configured to transmit an optical signal onto the third closed path at the second wavelength, and configured to transmit an optical signal onto the third closed path at the first wavelength, and an optical receiver interface configured to receive an optical signal from a location along the third closed path at the third wavelength.

The optical receiver interface of the first node can be further configured to receive an optical signal from a location along the first closed path at the second wavelength.

In another general aspect, an apparatus includes: a first optical network configured to propagate a guided mode around a first closed path; a second optical network configured to propagate a guided mode around a second closed path; a switch node coupled to the first closed path and the second closed path; and a plurality of nodes that are configured to communicate among the plurality of nodes through the first optical network using a first set of wavelengths, and to communicate with the switch node through the first optical network using a second wavelength that is different from the first set of wavelengths.

Implementations can include one or more of the following features. The plurality of nodes can include a first node and a second coupled to the first closed path and not coupled to the second closed path, the first node can include an optical transmitter interface configured to transmit an optical signal along a portion of the first closed path to the second node at a first wavelength, the optical transmitter interface of the first node can be configured to transmit an optical signal along a portion of the first closed path to the switch node at a second wavelength, and the first node can include an optical receiver interface configured to receive an optical signal from a location along the first closed path at a third wavelength.

The second node can include an optical transmitter interface configured to transmit an optical signal along a portion of the first closed path to the first node at the third wavelength, the optical transmitter interface of the second node can be configured to transmit an optical signal along a portion of the first closed path to the third node at the second wavelength, and the second node can include an optical receiver interface configured to receive an optical signal from a location along the first closed path at the first wavelength.

The switch node can include an optical transmitter interface configured to transmit an optical signal onto the first closed path at the first wavelength, the optical transmitter interface of the switch node can be configured to transmit an optical signal onto the first closed path at the third wavelength, and the switch node can include an optical receiver interface configured to receive an optical signal from a location along the first closed path at the second wavelength.

In another general aspect, a method for transmitting optical signals among a plurality of nodes coupled to an optical network configured to propagate a guided mode around a closed path is provided. The method includes: at each node in a subset of the plurality of nodes, transmitting optical signals from that node to other nodes in the subset at a unique wavelength assigned to that node for transmission within the subset from a set of wavelengths. The method includes, at each node in the subset, receiving optical signals from other nodes in the subset at wavelengths in the set of wavelengths other than the unique wavelength assigned to that node for transmission within the subset. The method includes, at a node in the plurality of nodes that is not in the subset of nodes, communicating with each of the nodes in the subset using a wavelength that is not in the set of wavelengths.

In another general aspect, an apparatus includes: a first optical network configured to propagate a guided mode around a first closed path; and a plurality of nodes including at least a first node, a second node, and a third node coupled to the first closed path. The plurality of nodes are configured to communicate over the first optical network using a plurality of wavelengths including at least a first wavelength, a second wavelength, and a third wavelength. The first node includes: an optical transmitter interface configured to transmit a first optical signal at the first wavelength onto the first closed path, an optical receiver interface configured to simultaneously detect from the first closed path a second optical signal at a second wavelength and a third optical signal at a third wavelength, and demodulation circuitry coupled to the optical receiver interface of the first node. The demodulation circuitry is configured to determine, for a plurality of time slots, a mapping between a plurality of amplitude levels detected during the time slots and binary symbols modulated onto each of the second optical signal and third optical signal. The second node includes: an optical transmitter interface configured to transmit the second optical signal onto the first closed path, an optical receiver interface configured to simultaneously detect from the first closed path a plurality of optical signals at respective wavelengths different from the second wavelength, and demodulation circuitry coupled to the optical receiver interface of the second node. The demodulation circuitry is configured to determine, for a plurality of time slots, a mapping between a plurality of amplitude levels detected during the time slots and binary symbols modulated onto each of the plurality of optical signals detected by the optical receiver interface of the second node.

Implementations can include one or more of the following features. The third node can include: an optical transmitter interface configured to transmit the third optical signal onto the first closed path, an optical receiver interface configured to simultaneously detect from the first closed path a plurality of optical signals at respective wavelengths different from the third wavelength, and demodulation circuitry coupled to the optical receiver interface of the third node. the demodulation circuitry can be configured to determine, for a plurality of time slots, a mapping between a plurality of amplitude levels detected during the time slots and binary symbols modulated onto each of the plurality of optical signals detected by the optical receiver interface of the third node.

The binary symbols can correspond to non-return-to-zero (NRZ) binary symbols.

For the demodulation circuitry coupled to the optical receiver interface of the first node, the plurality of amplitude levels detected during the time slot consist of a set of four amplitude levels can include: a first amplitude level that correspond to approximately zero power in the second optical signal and approximately zero power in the third optical signal, a second amplitude level that corresponds to a first predetermined amount of power in the second optical signal and approximately zero power in the third optical signal, a third amplitude level that corresponds to approximately zero power in the second optical signal and a second predetermined amount of power in the third optical signal, and a fourth amplitude level that corresponds to a third predetermined amount of power that is substantially equal to a sum of the first predetermined amount of power in the second optical signal and the second predetermined amount of power in the third optical signal.

The first node can further include: a second optical receiver interface configured to simultaneously detect from the first closed path a plurality of optical signals at respective wavelengths different from the first wavelength, the second wavelength, and the third wavelength. The first node can further include second demodulation circuitry coupled to the second optical receiver interface of the first node and configured to determine, for a plurality of time slots, a mapping between a plurality of amplitude levels detected during the time slots and binary symbols modulated onto each of the plurality of optical signals detected by the second optical receiver interface of the first node.

The plurality of nodes can include 2N+1 nodes. The demodulation circuitry coupled to the optical receiver interface of the first node can include at least N detectors each configured to determine, for a plurality of time slots, a mapping between at least four amplitude levels detected during the time slots and binary symbols modulated onto each of at least two optical signals.

The plurality of nodes can include 2N+1 nodes, and the demodulation circuitry coupled to the optical receiver interface of the first node can be configured to determine, for a plurality of time slots, a mapping between at least $2^N$ amplitude levels detected during the time slots and binary symbols modulated onto each of at least 2N optical signals.

The first node can be configured to couple substantially all remaining optical power at the first wavelength from the first optical path preventing interference with the first optical signal transmitted by the optical transmitter interface of the first node.

In another general aspect, an apparatus includes: a first optical network configured to propagate a guided mode around a first closed path; and a plurality of nodes including at least a first node coupled to the first closed path. The plurality of nodes are configured to communicate over the first optical network using a plurality of wavelengths including at least a first wavelength, a second wavelength, and a third wavelength. The first node includes: an optical transmitter interface configured to transmit a first optical signal at the first wavelength onto the first closed path, an optical receiver interface configured to simultaneously detect from the first closed path a second optical signal at a second wavelength and a third optical signal at a third wavelength, and demodulation circuitry coupled to the optical receiver interface of the first node. the demodulation circuitry is configured to determine, for a plurality of time slots, a mapping between a plurality of amplitude levels detected during the time slots and binary symbols modulated onto each of the second optical signal and third optical signal.

Implementations can include one or more of the following features. The plurality of nodes can include a second node that includes an optical transmitter interface configured to transmit the second optical signal onto the first closed path, an optical receiver interface configured to simultaneously detect from the first closed path a plurality of optical signals at respective wavelengths different from the second wavelength, and demodulation circuitry coupled to the optical receiver interface of the second node. The demodulation circuitry is configured to determine, for a plurality of time slots, a mapping between a plurality of amplitude levels detected during the time slots and binary symbols modulated onto each of the plurality of optical signals detected by the optical receiver interface of the second node.

In another general aspect, a method includes, at a first node coupled to a first optical network configured to propagate a guided mode around a first closed path, transmitting a first optical signal at a first wavelength onto the first closed path; an the first node, simultaneously detecting from the first closed path a second optical signal at a second wavelength and a third optical signal at a third wavelength; and determining, for a plurality of time slots, a mapping between a plurality of amplitude levels detected during the time slots and binary symbols modulated onto each of the second optical signal and third optical signal.

Implementations can include one or more of the following features. The method can include, at a second node coupled to the first optical network: transmitting the second optical signal onto the first closed path, simultaneously detecting from the first closed path a plurality of optical signals at respective wavelengths different from the second wavelength, and determining, for a plurality of time slots, a mapping between a plurality of amplitude levels detected during the time slots and binary symbols modulated onto each of the plurality of optical signals detected by the optical receiver interface of the second node.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 9A, 9B, and 9C are tables of values for receiving multiple wavelengths simultaneously.

Like reference numbers and designations in the various drawings indicate like elements.

DETAILED DESCRIPTION

Figure 1A:
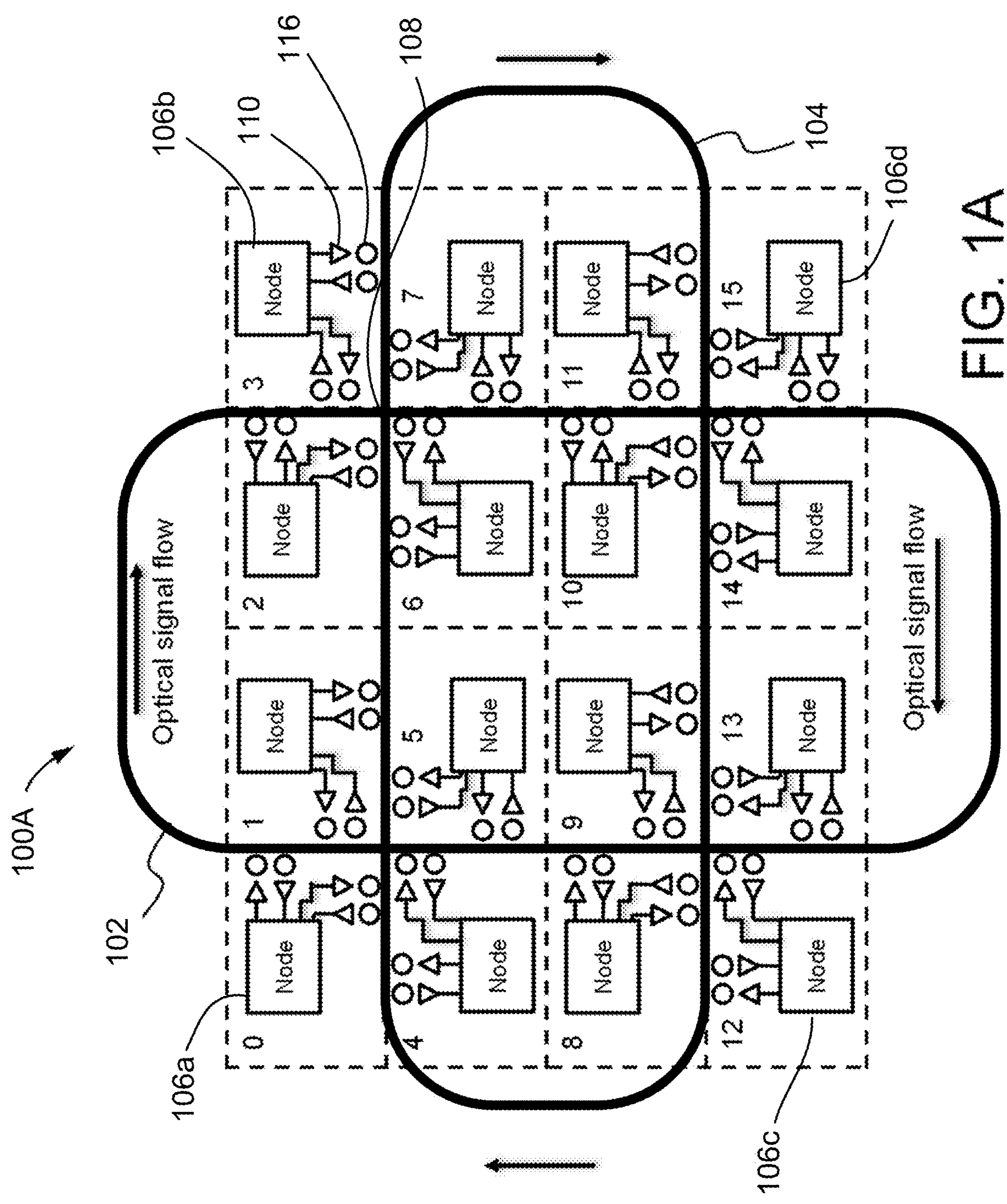
FIGS. 1A and 1B are schematic diagrams of examples of optically coupled multi-node computing systems.

FIG. 1A shows a schematic diagram of an example of an optically coupled multi-node computing system 100A. The system 100A includes 16 nodes (labeled 0 to 15) (e.g., 106*a*, 106*b*, 106*c*, 106*d*, collectively referenced as 106) that are coupled to an optical network comprising overlapped uni-directional optical loops 102 and 104 that provide optical signal flow for sending optical signals between different pairs of nodes 106. Each of the optical loops 102, 104 can be implemented, for example, as an optical waveguide that is formed on an integrated platform to propagate a guided mode around a closed path. In this example, the four locations (e.g., 108) at which the paths of the optical loops 102, 104 overlap do not include any switching elements. Thus, optical signals can cross these overlap locations without significant loss if the waveguides are fabricated in different layers of a photonic integrated circuit at those overlap locations without physically intersecting. Alternatively, the optical signals can cross these overlap locations with a relatively small loss if the waveguides do intersect each other at the overlap locations (e.g., 0.05 dB-0.1 dB per intersection).

The nodes 106 can be configured as computing nodes that include one or more processors, and other optical, electronic, or optoelectronic circuitry, which can be integrated into an integrated circuit for each node, or a single integrated circuit comprising all 16 nodes. The processors can include one or more digital central processing units (or cores), and/or one or more photonic computing modules, such as optoelectronic matrix multiplication modules, as described for example in U.S. patent application Ser. No. 16/431,167, filed on Jun. 4, 2019, and U.S. patent application Ser. No. 17/204,320, filed on Mar. 17, 2021 (provided in Appendix A), both of the above applications are incorporated herein by reference. In this example, each node is coupled to both optical loops 102 and 104 by a corresponding pair of transmitter and receiver modules 110. The transmitter and receiver modules 110 can be coupled to a location on an optical loop using a ring resonator 116, for example. In this example, every node 106 is optically coupled to both loops 102, 104, so an optical signal can go from one node to any other node in one hop. Here, the term "hop" generally refers to a transmission of an optical signal from one node or switch to another node or switch. Thus, if an optical signal travels from node A directly to node B, that is one hop. If an optical signal travels from node A to node B through a switch node or an intermediary node C, that is two hops. The bisection bandwidth for this implementation is:

$$O(\sqrt{N}) * Tx/Rx\ BW * \#\ \text{wavelength}.$$

Here, N represents the number of nodes, Tx/Rx BW represents the transmitting bandwidth (Tx BW) or the receiving bandwidth (Rx BW) (typically Tx BW=Rx BW), and #wavelength represents the number of wavelengths used to transmit signals among the nodes 106. Bisection bandwidth generally refers to the maximum bandwidth between any two nodes 106 in the system 100A. For any two nodes in the system 100A, the maximum bandwidth between those two nodes will be at least the bisection bandwidth. It is possible that for some pair of nodes, the maximum bandwidth between the two nodes of the pair will be greater than the bisection bandwidth. The bisection bandwidth is a measure of the transmission bottleneck in the system, so a larger bisection bandwidth is generally preferable.

In some implementations, each node uses a designated wavelength to transmit optical signals, and different nodes use different wavelengths to transmit optical signals. For example, node 0 uses wavelength WL0 to transmit optical signals, node 1 uses wavelength WL1 to transmit optical signals, . . . , and node 15 uses wavelength WL15 to transmit optical signals. When the nodes 1 to 15 receive an optical signal having a wavelength WL0, the nodes 1 to 15 know that the optical signal is sent from node 0. Similarly, when the nodes 0 and 2 to 15 receive an optical signal having a wavelength WL1, the nodes 0 and 2 to 15 know that the optical signal is sent from node 1. Each node upon receiving an optical signal can decide whether to further process the optical signal or ignore it. In this example, each node broadcasts optical signals to the other nodes, and it is up to the other nodes to determine what to do with the received signals.

Because there are two optical loops 102 and 104, it is possible for each node to send a first optical signal on the optical loop 102, and send a second optical signal on the optical loop 104 during the same time slot. Having two optical loops 102 and 104 increases the bandwidth of communication among the nodes, as compared to having just one optical loop.

In some implementations, the number of wavelengths used by the nodes for transmission of optical signals is smaller than the number of nodes. Two or more nodes share the same wavelength when transmitting optical signals. The system 100A includes a controller for scheduling the transmissions of optical signals among the nodes that share the same wavelength on the same loop. For example, suppose nodes 0 to 3 use wavelength WL0 to transmit optical signals, nodes 4 to 7 use wavelength WL1 to transmit optical signals, nodes 8 to 11 use wavelength WL2 to transmit optical signals, and nodes 12 to 15 use wavelength WL3 to transmit optical signals. The controller can schedule data transmission by different nodes that share a wavelength through an optical loop at different times. For example, the controller can configure one of nodes 0 to 3 to transmit an optical signal with wavelength WL0 in a loop in time slot 0, one of nodes 4 to 7 to transmit an optical signal with wavelength WL1 in a loop in the time slot 0, one of nodes 9 to 11 to transmit an optical signal with wavelength WL2 in a loop in the time slot 0, and one of nodes 12 to 15 to transmit an optical signal with wavelength WL3 in a loop in the time slot 0.

Because there are two optical loops 102 and 104, it is possible for each node to send a first optical signal on the optical loop 102, and send a second optical signal on the optical loop 104 during the same time slot. It is also possible for a first node to send a first optical signal on the optical loop 102, and a second node to send a second optical signal on the optical loop 104 during the same time slot, in which the first and second nodes share the same transmission wavelength.

In some implementations, multiple nodes share the same transmission wavelength, and the system 100A includes a controller for scheduling the transmissions of optical signals among the nodes 106. The controller also notifies the intended recipient of the signals, so that the receiver nodes know that they should expect to receive signals at particular time slots. For example, the controller can schedule data transmission between different pairs of nodes through an optical loop at different times. The controller can configure a first node (e.g., node 1) as a transmitter and a second node (e.g., node 10) as a receiver on an optical loop during a first time period t1, and prevent the other nodes on the same optical loop from transmitting optical signals during the first time period t1. The controller can configure a third node (e.g., node 3) as a transmitter and a second node (e.g., node 0) as a receiver on an optical loop during a second time period t2, and prevent the other nodes from transmitting optical signals on the same optical loop during the second time period t1, and so forth. Because there are two optical loops 102 and 104, it is possible to have a first node send a first optical signal to a second node on the optical loop 102, and have a third node send a second optical signal to a fourth node on the optical loop 104 during the same time period. Having two optical loops 102 and 104 increases the bandwidth of communication among the nodes, as compared to having just one optical loop.

The system 100A includes an array of four rows and four columns of nodes. The optical loop 102 includes a first waveguide section that extends between the first and second columns of nodes and is optically coupled to every node in the first and second columns. The optical loop 102 includes a second waveguide section that extends between the third and fourth columns of nodes and is optically coupled to every node in the third and fourth columns. Thus, the optical loop 102 is optically coupled to every node in the array of nodes. The optical loop 104 includes a first waveguide section that extends between the first and second rows of nodes and is optically coupled to every node in the first and second rows. The optical loop 104 includes a second waveguide section that extends between the third and fourth rows of nodes and is optically coupled to every node in the third and fourth rows.

Figure 1B:
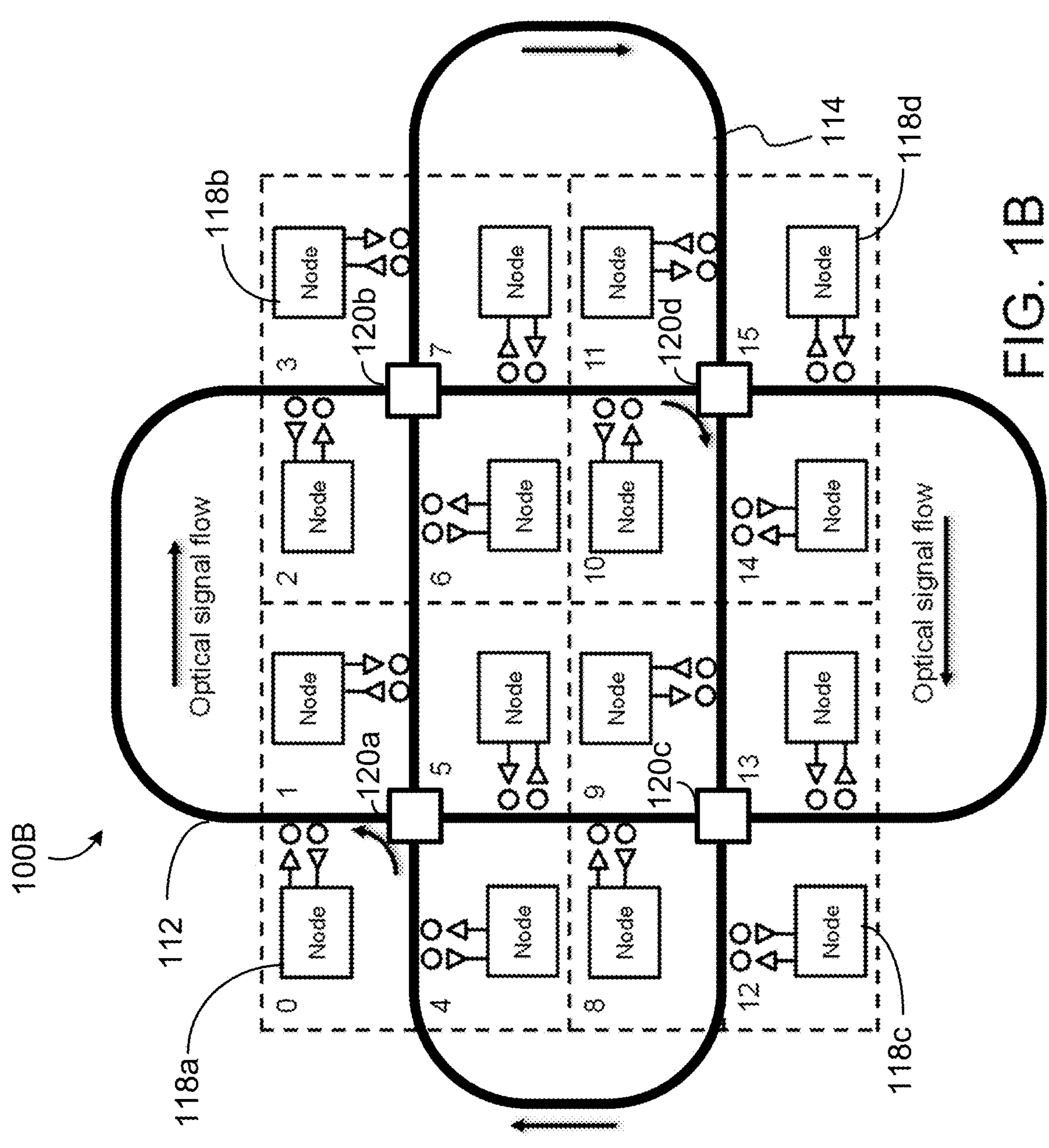

FIG. 1B shows a schematic diagram of an example of an optically coupled multi-node computing system 100B. The system 100B includes 16 nodes (labeled 0 to 15) (e.g., 118*a*, 118*b*, 118*c*, 118*d*, collectively referenced as 118) that are coupled to an optical network comprising overlapped uni-directional optical loops 112 and 114 that provide optical signal flow for sending optical signals between different pairs of nodes 118. In this example, the overlap locations include switches 120*a*, 120*b*, 120*c*, 120*d* (collectively referenced as 120) that are configured to pass optical signal flow between the two optical loops 112 and 114. Thus, in this example, each node 118 is only coupled to one of the optical loops 112 or 114, and an optical signal can go from one node to any another node in a single hop if the optical signal does not pass a switch 120, or in two hops if the optical signal traverses a switch 120 along the way. Also, the optical cross-talk between the optical loops 112 and 114 can be reduced by the presence of the switches. The bisection bandwidth for this implementation is also:

$$O(\sqrt{N}) * Tx/Rx\ BW * \#\ \text{wavelength}.$$

In some implementations, the system 100B includes a controller for scheduling the transmissions of optical signals among the nodes 118, and configuring the switches 120 to enable the optical signals to be transmitted from the transmitter to the receiver. For example, in order for node 1 to be able to transmit an optical signal to node 4, the controller configures the switches 120*b*, 120*d*, and 120*c* to be in a pass state (see FIGS. 4A and 5A) so that the optical signal can traverse from node 1 to the switch 120*b*, from the switch 120*b* to the switch 120*d*, from the switch 120*d* to the switch 120*c*, and from the switch 120*c* to node 4 on the optical loop 114. In order for node 1 to be able to transmit an optical signal to node 5, the controller configures the switches 120*b* and 120*d* to be in a pass state and the switch 120*c* to be in a switch state (see FIGS. 4B and 5B) so that the optical signal can traverse from node 1 to the switch 120*b*, from the switch 120*b* to the switch 120*d*, from the switch 120*d* to the switch 120*c* on the optical loop 114, and from the switch 120*c* to node 5 on the optical loop 112. Alternatively, the controller can configure the switch 120*b* to be in a switch state and the switches 120*d* and 120*c* to be in a pass state so that the optical signal can traverse from node 1 to the switch 120*b* on the optical loop 114, from the switch 120*b* to the switch 120*d*, from the switch 120*d* to the switch 120*c*, and from the switch 120*c* to node 5 on the optical loop 112.

In some implementations, the controller can evaluate the configuration of the switches to determine whether only one pair of nodes can communicate with each other during a time period, or two pairs of nodes can communicate with each other during the time period. If during a first time period the switches are configured such that the optical loops 112, 114 form a single optical path, then only two nodes can communicate with each other on that optical path during the first time period. If during a second time period the switches are configured such that the optical loops 112, 114 form two separate optical paths, then a first node and a second node can communicate with each other, and a third node and a fourth node can communicate with each other during the second time period.

In some implementations, each switch 120 switches an optical signal to either allow the optical signal to continue to travel on the same optical loop, or switch to a different optical loop, without further processing the optical signal. In some implementations, for example in a larger optical network in which an optical signal can traverse a large number of switches resulting in large signal attenuation, one or more of the switches can provide optical amplification to boost the signal level. In some implementations, one or more of the switches can convert the received optical signal to an electrical signal, process the electrical signal using electronic circuitry, convert the electrical signal back to an optical signal, and transmit the optical signal to the next destination.

Figure 2A:
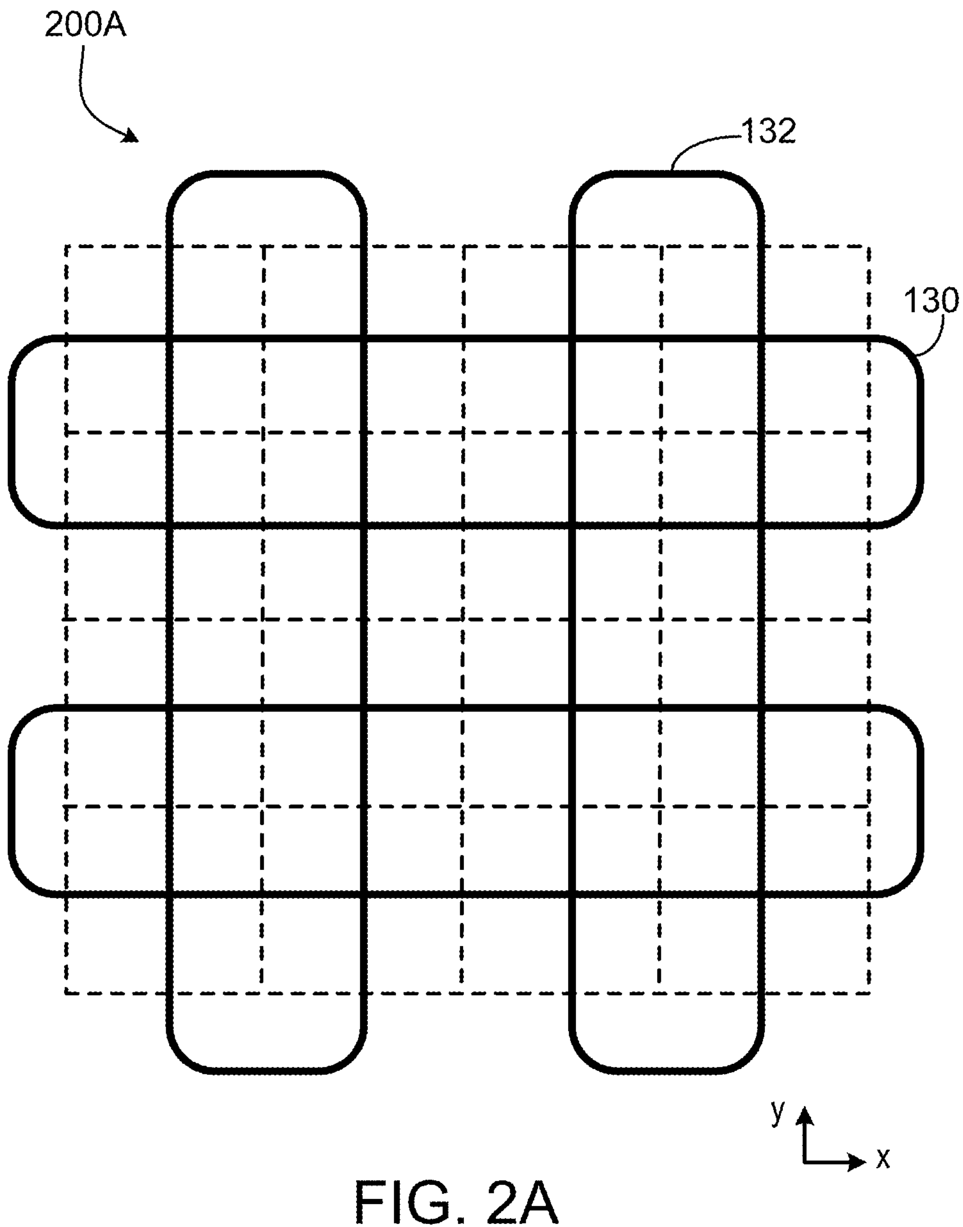
FIGS. 2A, 2B, 2C and 2D are schematic diagrams of example optical loop arrangements.
Figure 2B:
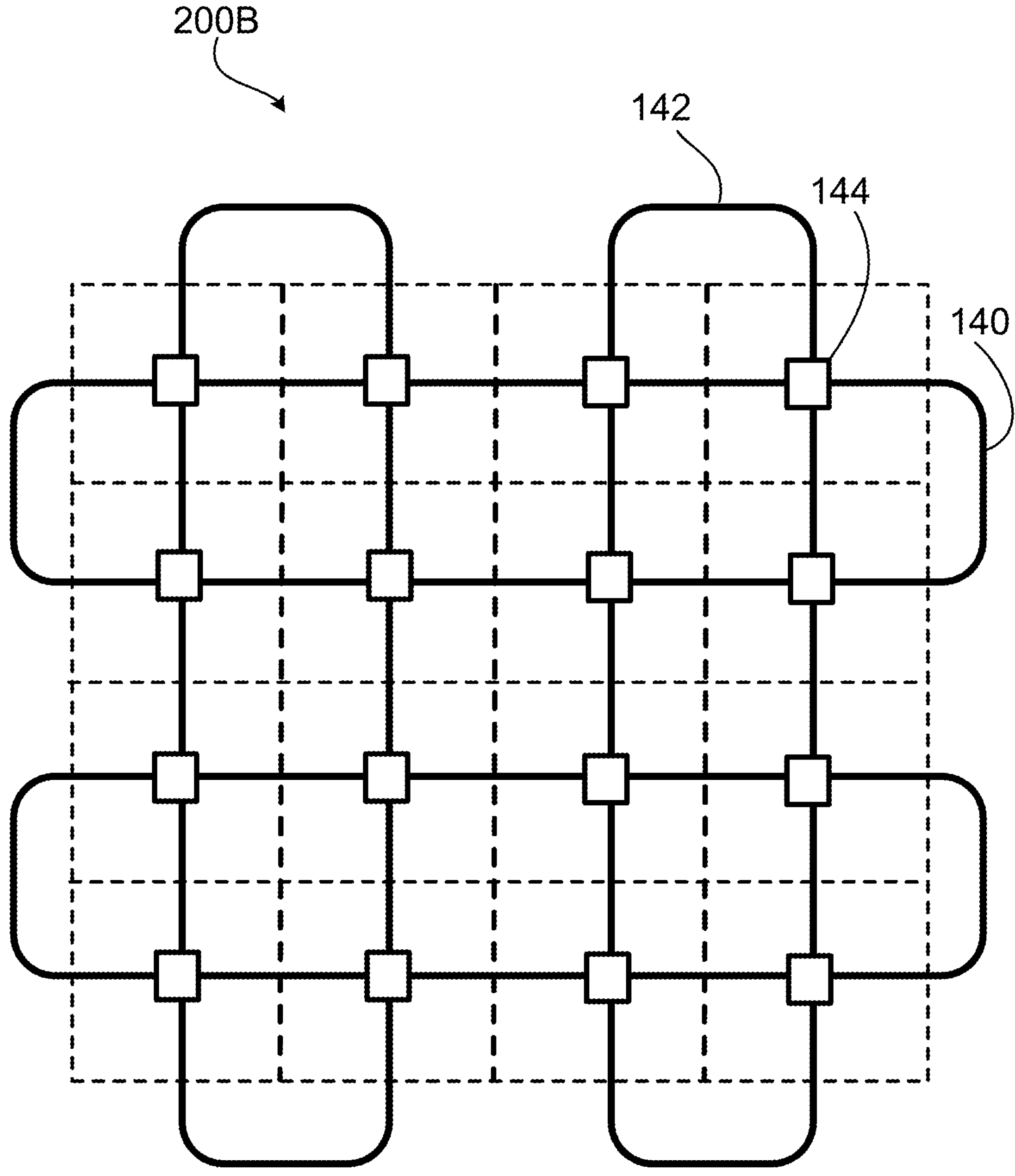

Other examples of such optically coupled multi-node computing systems can be implemented. For example, in some implementations, there can be a subset of the overlap locations that include switches. Also, multiple optical loops oriented vertically (e.g., in the y-direction) and horizontally (e.g., in the x-direction) can be combined such that any two optical loops overlap with each other at four locations. FIG. 2A shows an example of an arrangement 200A that has four optical loops, including two horizontal loops 130 that have long straight sections that extend in the x-direction and two vertical loops 132 that have long straight sections that extend in the y-direction. FIG. 2B shows an example of another arrangement 200B that has four optical loops, including two horizontal loops 140 and two vertical loops 142, in which a switch 144 is provided at each location where two loops overlap.

Figure 2C:
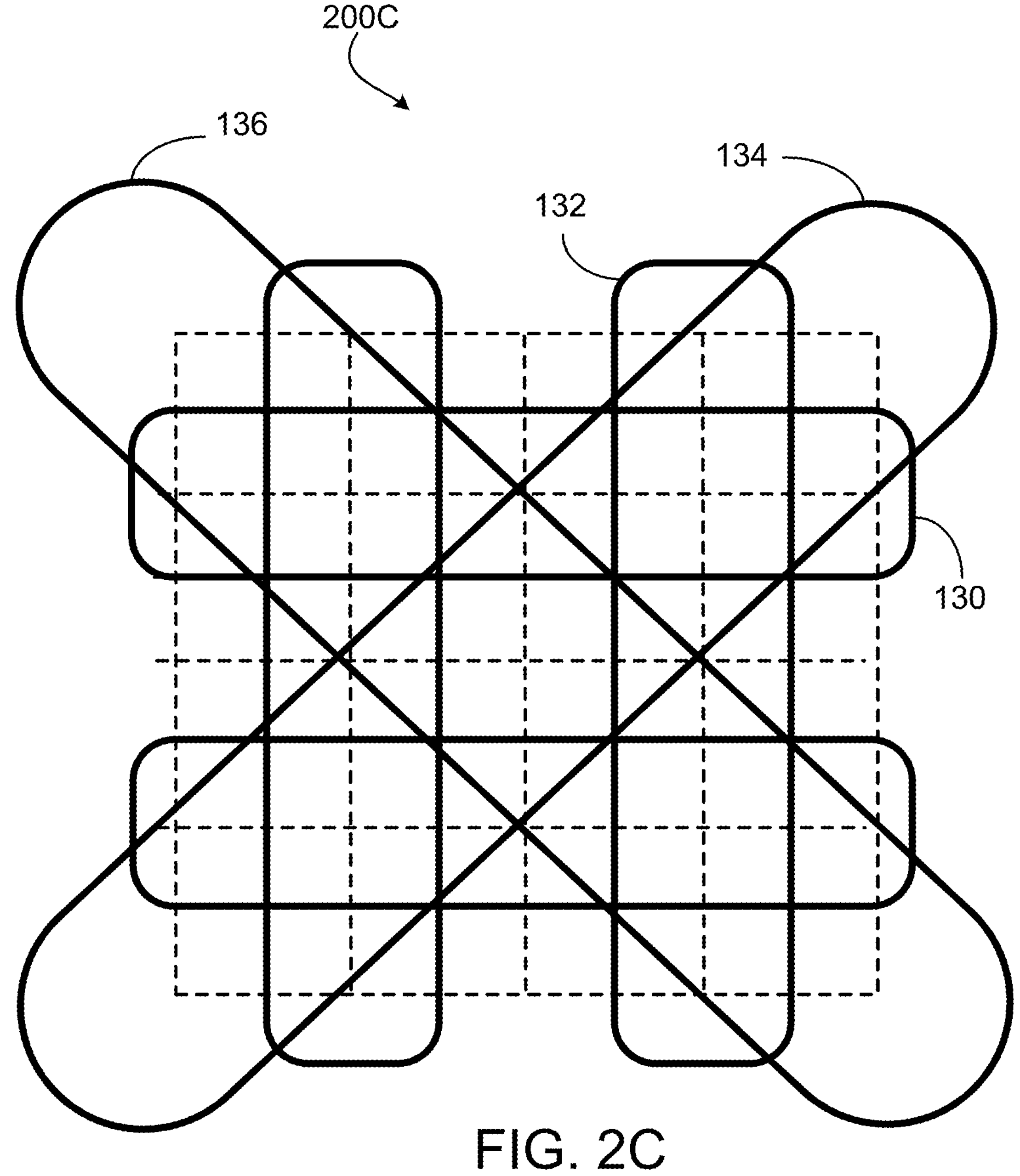

FIG. 2C shows an example of a unidirectional loop optical network 200C that has six optical loops, including two horizontal loops 130 that have long straight sections that extend in the x-direction, two vertical loops 132 that have long straight sections that extend in the y-direction, and two diagonal loops 134, 136. The diagonal loop 134 allows the nodes in the upper right quadrant of the array of nodes to communicate with the nodes in the lower left quadrant. The diagonal loop 136 allows the nodes in the upper left quadrant of the array of nodes to communicate with the nodes in the lower right quadrant.

Figure 2D:
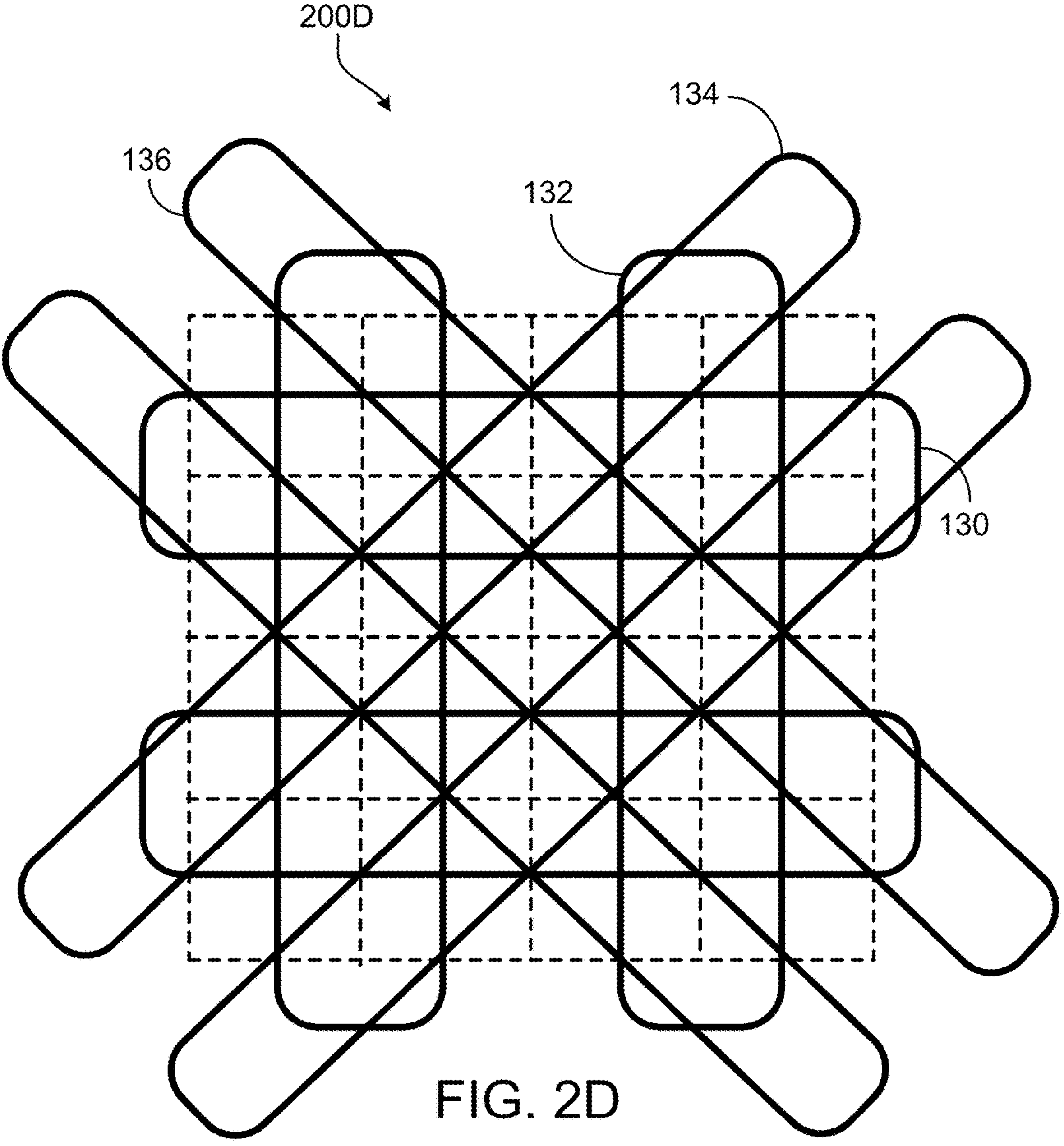

FIG. 2D shows an example of a unidirectional loop optical network 200D that has right optical loops, including two horizontal loops 130 that have long straight sections that extend in the x-direction, two vertical loops 132 that have long straight sections that extend in the y-direction, and four diagonal loops 136. The diagonal loop 134 allows the nodes in the upper right quadrant of the array of nodes to communicate with the nodes in the lower left quadrant. The diagonal loop 136 allows the nodes in the upper left quadrant of the array of nodes to communicate with the nodes in the lower right quadrant. The unidirectional loop optical network 200D has higher transmission bandwidth in the diagonal direction as compared to the unidirectional loop optical network 200C.

Figure 3A:
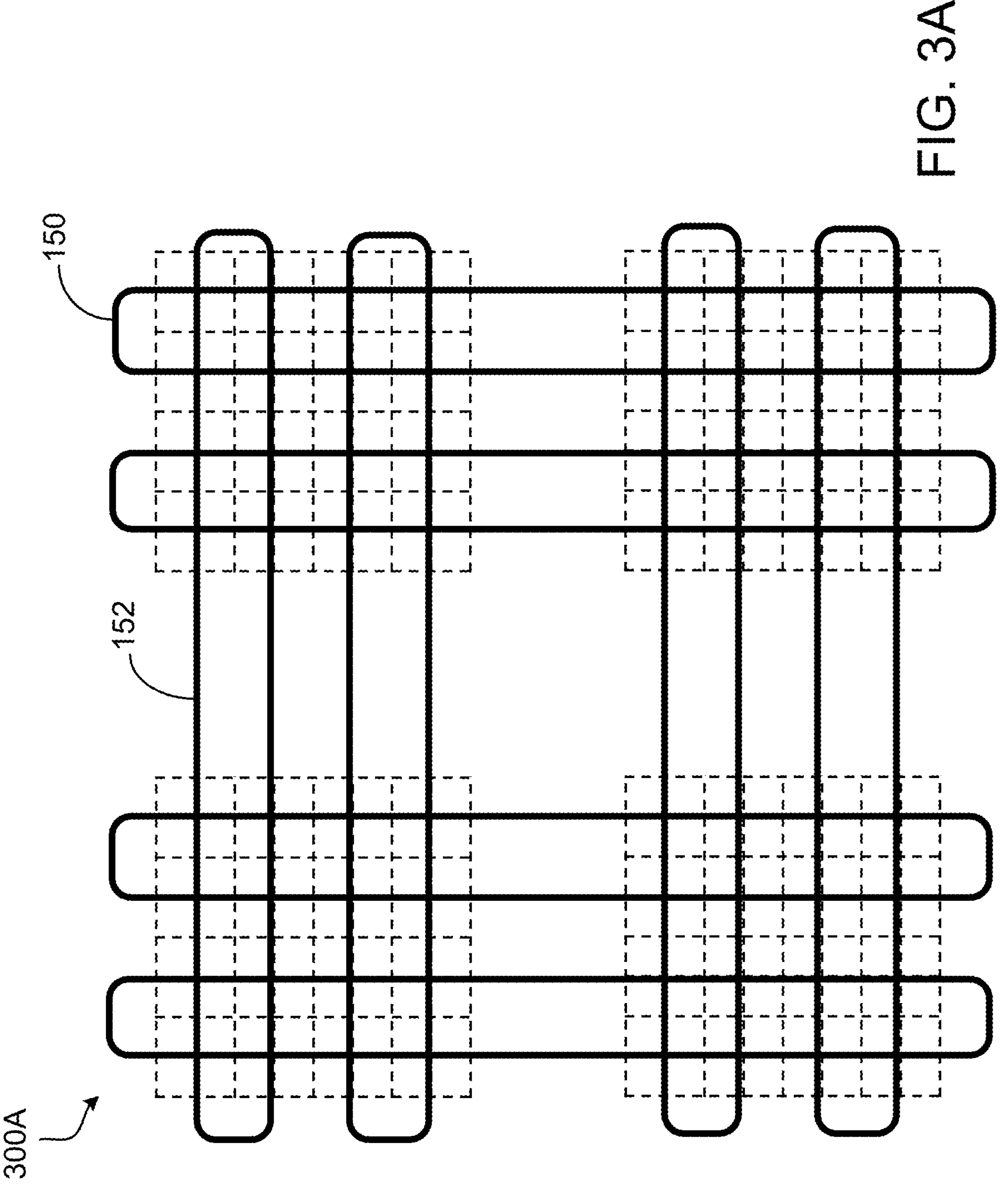
FIGS. 3A and 3B are schematic diagrams of example interconnections of multiple photonic integrated circuits.

Additionally, if there are subsets of neighboring nodes that are fabricated on different photonic integrated circuits (PICs), the PICs can be interconnected to provide the closed paths by interconnecting portions of the optical loops by optical fibers or fiber bundles, for example, as shown in the arrangement 300A in FIG. 3A that includes four PICs with respective ends of the partial loop waveguides 150 interconnected by segments of optical fibers 152. Such techniques can be used to scale a system up.

Figure 3B:
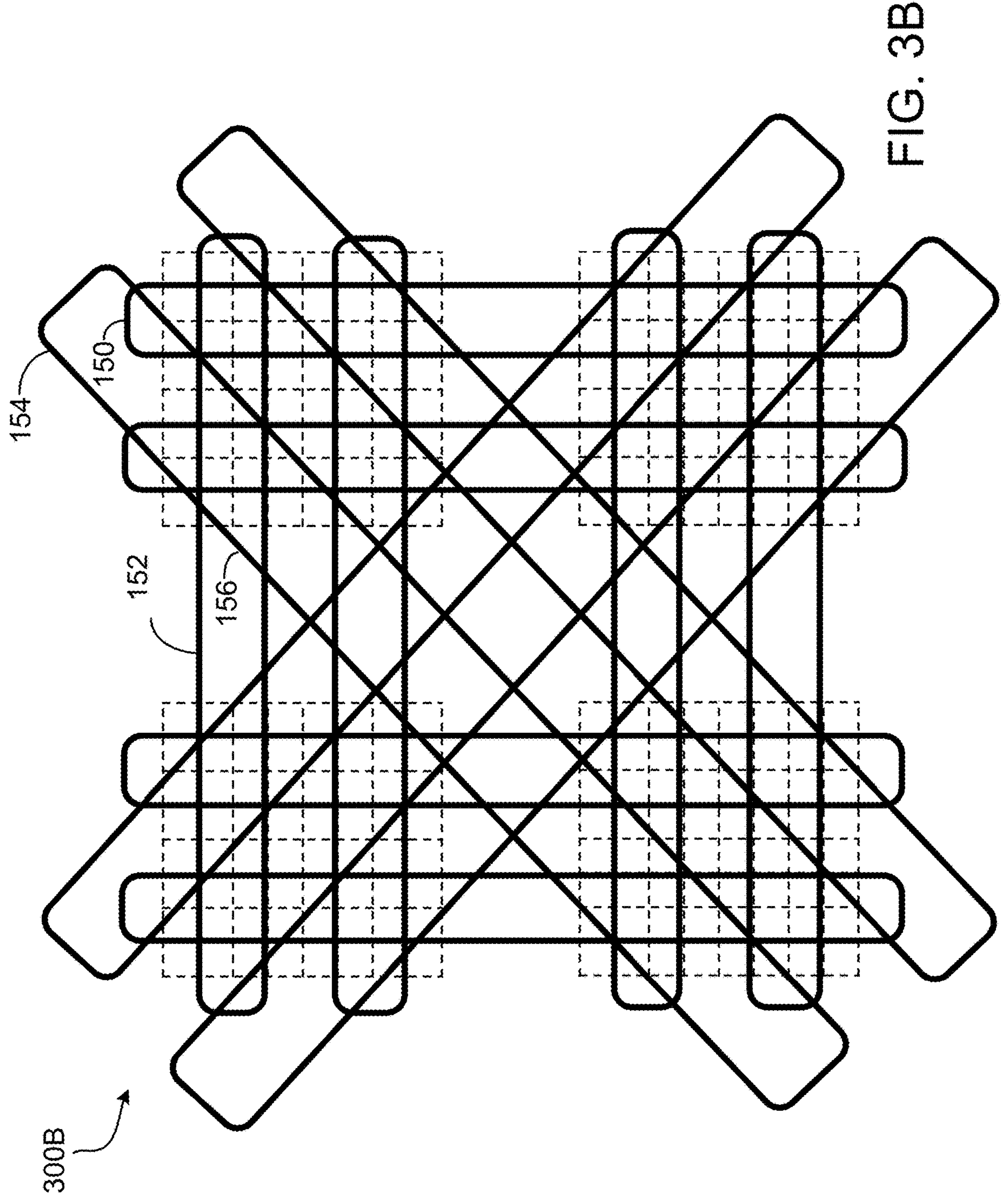

FIG. 3B shows an example of a unidirectional loop optical network 300B that includes the partial loop waveguides 150 interconnected by segments of optical fibers 152 that extend in x- and y-directions. The unidirectional loop optical network 300B also includes partial loop waveguides 154 interconnected by segments of optical fibers 156 that extend diagonally. The diagonal partial loop waveguides 154 and the segments of optical fibers 156 allow the nodes in the upper right photonic integrated circuit to communicate with the nodes in the lower left photonic integrated circuit, and allow the nodes in the upper left photonic integrated circuit to communicate with the nodes in the lower right photonic integrated circuit.

Figure 4A:
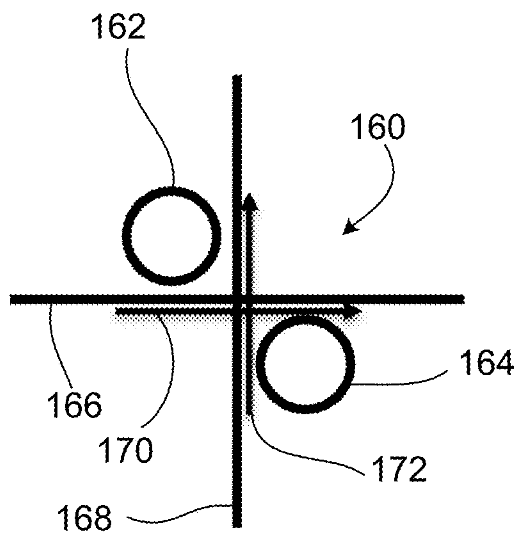
FIGS. 4A and 4B are schematic diagrams of different states of an example switch.
Figure 4B:
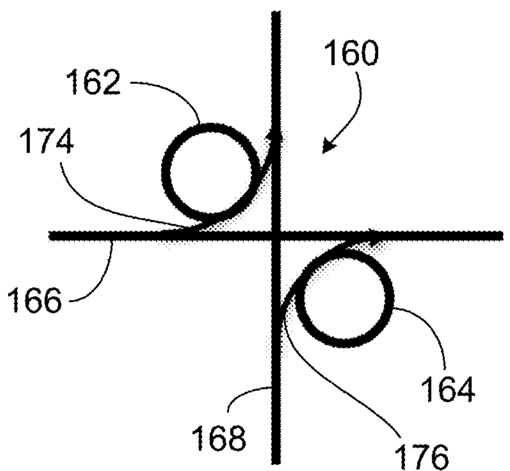
Figure 5A:
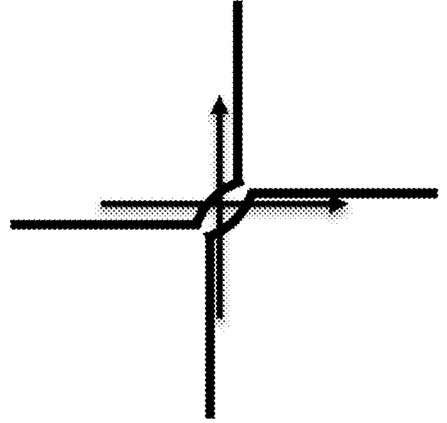
FIGS. 5A and 5B are schematic diagrams of different states of an example switch.
Figure 5B:
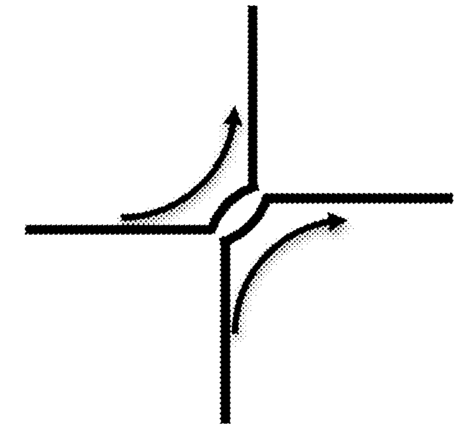

Various types of switches can be used at the overlap locations. In some implementations, a switch 160 is formed using two ring resonators 162, 164. The switch 160 has a pass state shown in FIG. 4A and a switch state shown in FIG. 4B. In the pass state, an optical signal 170 traveling on a waveguide 166 continues on the waveguide 166, and an optical signal 172 traveling on a waveguide 168 continues on the waveguide 168. In the switch state, an optical signal 174 traveling on the waveguide 166 is switched to the waveguide 168, and an optical signal 176 traveling on the waveguide 168 is switched to the waveguide 166. For example, when the switch having pass and switch states shown in FIGS. 4A, 4B is used in the optical loop arrangement of FIG. 2B, and the switch is in the switch state, the optical signal will switch from a horizontal loop to a vertical loop, or from a vertical loop to a horizontal loop. Given the narrow bandwidth of the ring resonators, this type of switch can be used to switch a single wavelength at a time. The ring resonators can be tuned, or there can be a separate pair of rings preconfigured for each wavelength.

In some implementations, a switch is formed using a Mach-Zehnder interferometer (MZI). The switch has a pass state shown in FIG. 5A and a switch state shown in FIG. 5B. Given the broad bandwidth of the MZI, this type of switch can be used to switch multiple wavelengths (e.g., all wavelengths) at the same time.

Figures 6A, 6B:
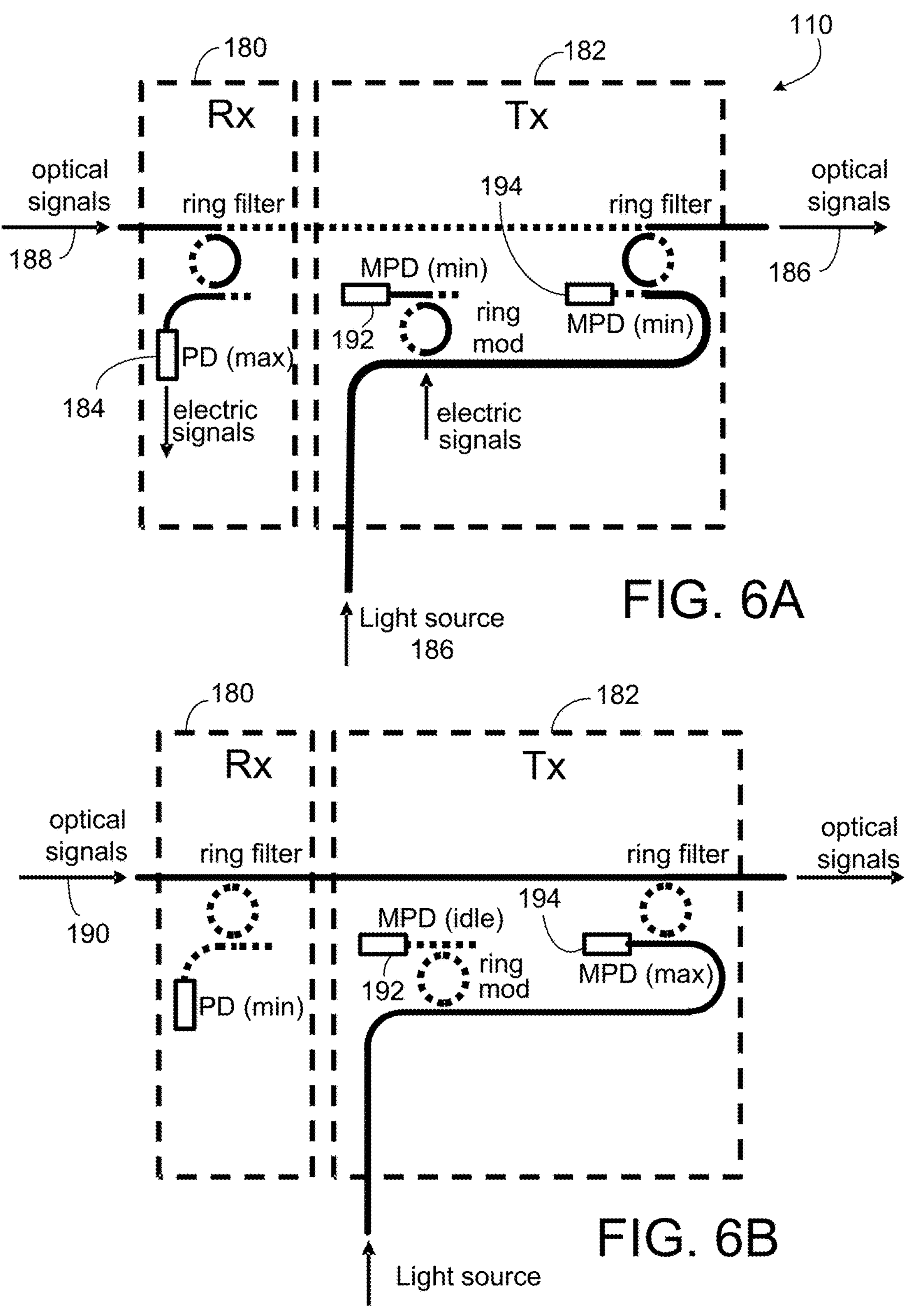
FIGS. 6A and 6B are schematic diagrams of different states of an example receiver/transmitter module for a node.

FIGS. 6A and 6B show different states of a receiver/transmitter module 110 that includes both an optical receiver interface (Rx) 180 and an optical transmitter interface (Tx) 182. In the state of FIG. 6A, the optical receiver interface Rx 180 is configured to couple substantially all optical power in a received optical signal 188 into a photodetector (PD) 184, and the optical transmitter interface Tx 182 is configured to modulate light from a light source 186 to provide an optical signal 186 that has been modulated with data. The dashed lines show a state of the respective waveguides in which there is substantially no optical power being propagated. In the state of FIG. 6B, the optical receiver interface Rx 180 is configured to let an input optical signal 190 pass without being coupled and detected, and the optical transmitter interface Tx 182 is configured to prevent any optical signal from being transmitted onto a coupled optical path. Measurement photodiodes (MPDs) 192, 194 can be used to confirm tuning of the ring resonators used to couple the transmitted/received optical signals. In the state of FIG. 6A, the measurement photodiode 192 should measure a low signal, and the measurement photodiode 194 should measure a low signal, In the state of FIG. 6B, the measurement photodiode 192 should be idle and not measure any signal, and the measurement photodiode 194 should measure a high signal.

Figure 7:
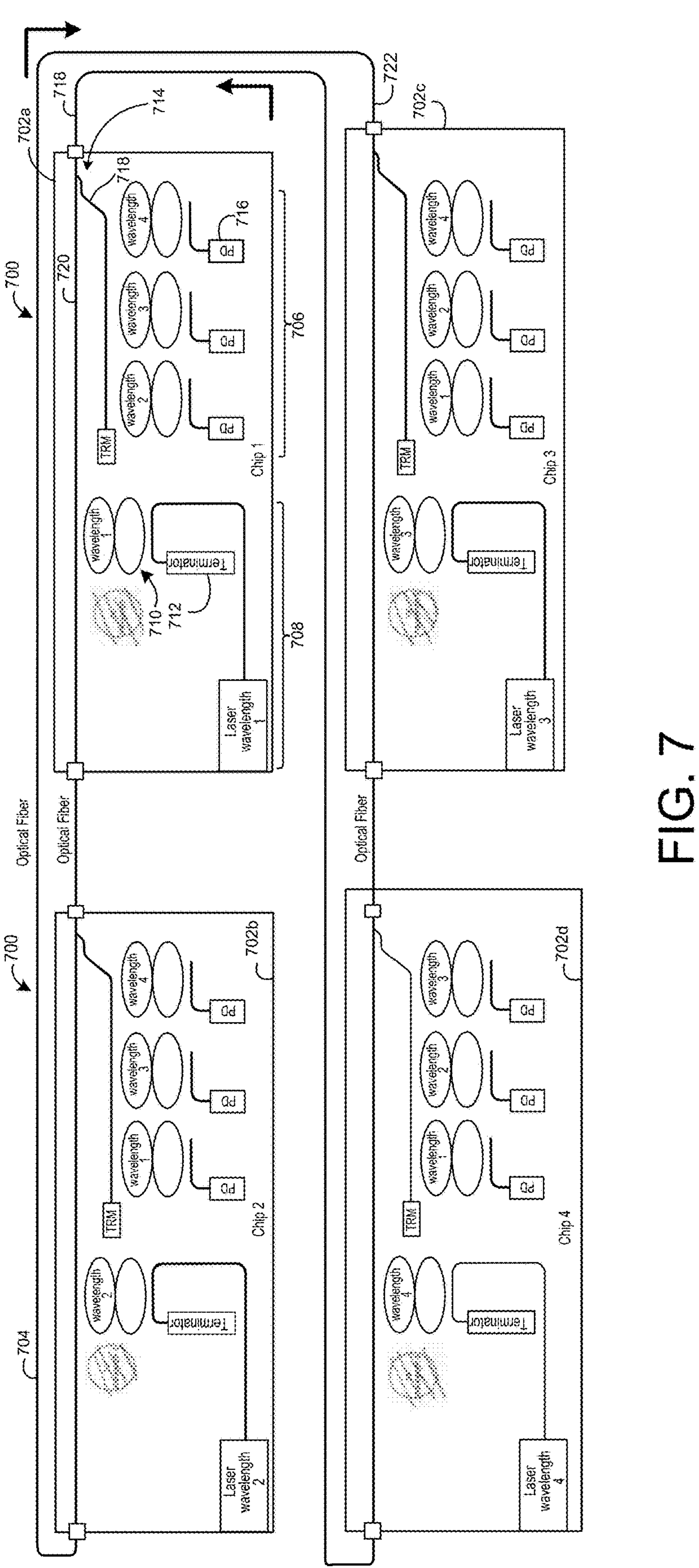
FIG. 7 is a schematic diagram of an example of an optically coupled multi-node computing system.

FIG. 7 shows another example of an optically coupled multi-node computing system 700 that includes multiple chips and uses 4 different wavelengths for communication among the chips. In this example, the system 700 includes four chips (labeled 1 to 4) 702*a*, 702*b*, 70*c*, 702*d* (collectively referenced as 702), which are interconnected (e.g., by optical fiber 704) to communicate over a unidirectional loop optical network 722. Each chip 702 can represent an optical communication interface for a computing node (not shown), for example. Each chip includes an optical receiver interface Rx 706 and an optical transmitter interface Tx 708. In this example, each chip 702 is configured to use a different laser wavelength for transmitting (i.e., wavelength 1 to 4), and is configured to receive each of the three remaining wavelengths into corresponding photodetectors that are coupled by respective ring resonators tuned to those wavelengths. For example, the chip 702*a* is configured to use a laser wavelength 1 for transmitting data, the chip 702*b* is configured to use a laser wavelength 2 for transmitting data, the chip 702*c* is configured to use a laser wavelength 3 for transmitting data, and the chip 702*d* is configured to use a laser wavelength 4 for transmitting data.

The optical receiver interface 706 of each chip 702 includes photodetectors 706 for detecting the received optical signal. The optical receiver interface 706 includes an optical splitter 714 having a first branch 718 and a second branch 720. The optical splitter splits the received optical signal, and a fraction (e.g., 25%) of the received optical power is sent to the first branch 718 with the remaining fraction (e.g., 75%) of the received optical power sent to the second branch 720. The optical signal in the first branch 718 is coupled to the photodetectors 706.

The optical transmitter interface Tx 708 includes a pair of ring resonators 710 that are configured to serve both as a pathway to couple a transmitted optical signal (originating from the optical transmitter interface Tx 708) in the appropriate direction onto the optical network 722 and to also couple substantially all received optical power in the second branch 720 at the same assigned wavelength (e.g., from the same transmitted signal after it propagates around the loop) to an optical terminator 712 in order to prevent that received optical power from interfering with the transmitted optical signal. The coupled (received) optical power propagates in the opposite direction around the pair of ring resonators 710 into the optical terminator 712.

Figure 8A:
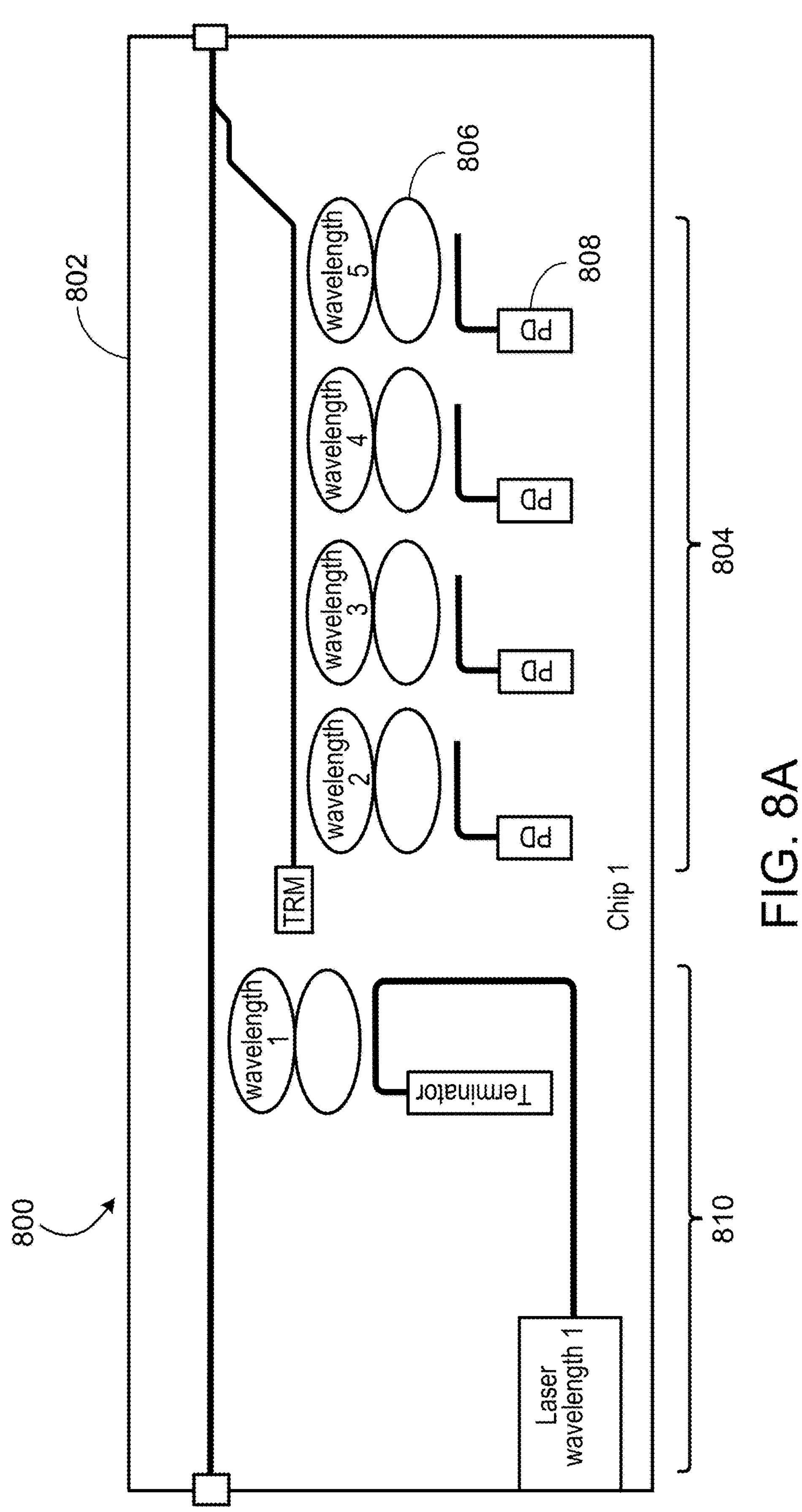
FIG. 8A is a schematic diagram of an example optical communication interface.

Referring to FIG. 8A, an example optical communication interface 800 can be used in an optical system that uses 5 wavelengths for communication between various optical communication interfaces. The optical communication interface 800 includes a chip 802 that is similar to the chip 702 of FIG. 7, except that the chip 802 includes 4 photodetectors in the optical receiver interface instead of 3 photodetectors as used in the chip 702. The chip 802 includes an optical transmitter interface 810 that uses one wavelength and an optical receiver interface 804 that has a separate set of ring resonators 806 and photodetector 808 for each of the remaining wavelengths in the system. In this example, the optical transmitter interface 810 uses wavelength 1. The optical receiver interface 804 includes 4 sets of ring resonators 806, in which each set of ring resonators 806 is designed to couple a particular one of the wavelengths 2 to 5 to a corresponding photodiode 808.

Figure 8B:
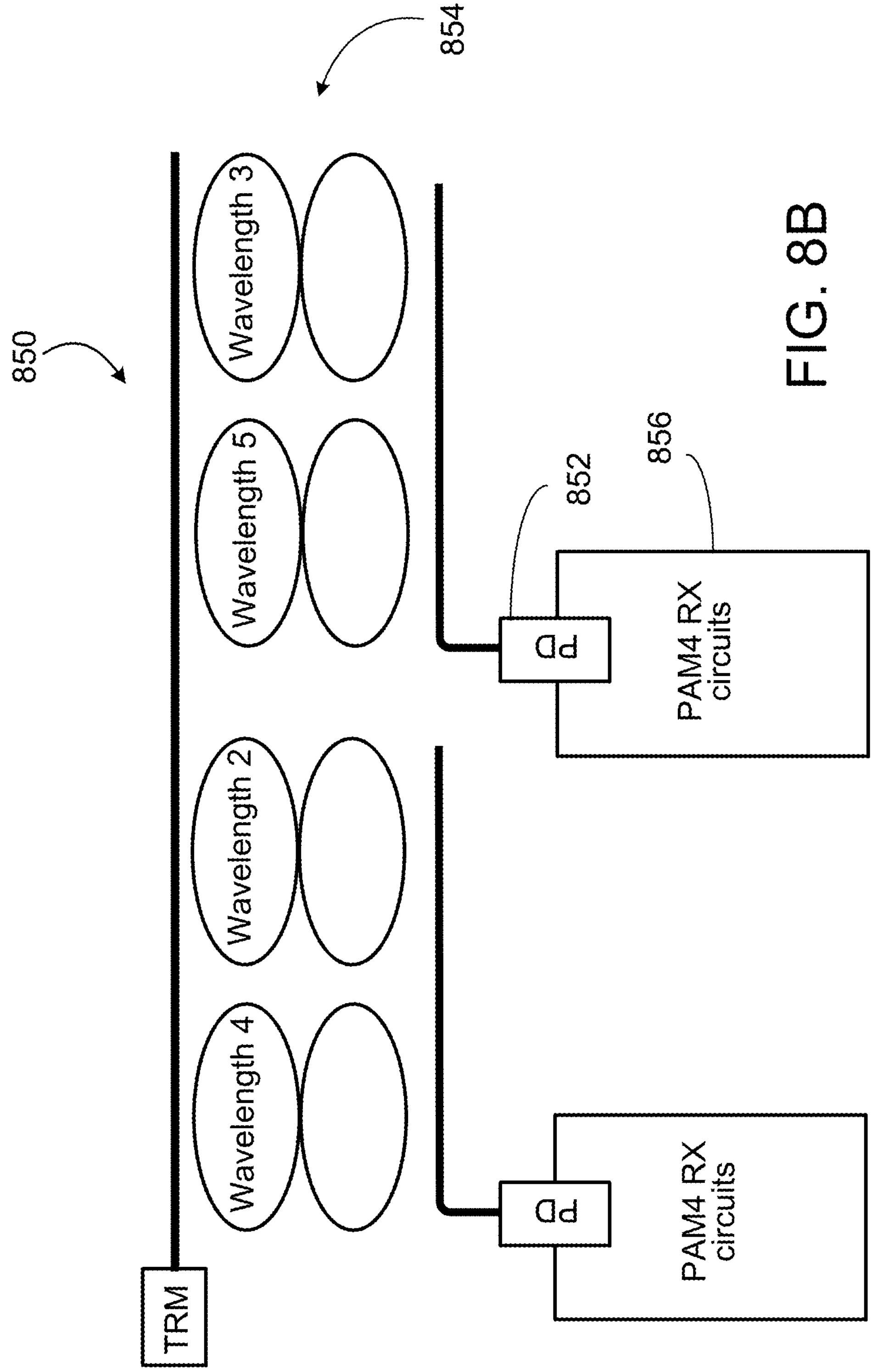
FIG. 8B is a schematic diagram of an example optical receiver interface.

In systems that use an odd number of wavelengths (e.g., 2N+1, N being an integer), the remaining 2N wavelengths can be detected individually, as in this example, or can be detected by fewer photodetectors within subsets of wavelengths, as shown in the optical receiver interface 850 of FIG. 8B. In this example, there are still 5 wavelengths, but there are only 2 photodetectors 852 instead of 4 photodetectors 808 (used in the example of FIG. 8A). Each photodetector 852 receives optical signals from two pairs of ring resonators 854.

In some implementations, the system uses PAM4 modulation for modulating the optical signals transmitted among the optical communication interfaces or chips to have four different predetermined amplitude levels. each photodetector 852 is connected to corresponding demodulation circuitry (PAM4 RX) 856 that is configured to perform PAM-4 demodulation on the four different predetermined amplitude levels of the received optical signal. Since there are two different wavelengths being combined onto a single photodetector 856, the optical power amplitude levels add incoherently (i.e., without interference). When an optical signal travels along the optical loop 722, a fraction of the optical power is split by each chip that the optical signal encounters along the optical loop 722. The greater the number of chips that the optical signal encounters, the greater the amount of optical power that is split off and the smaller the remaining optical power. Taking into account the coupling ratio of the directional coupler/splitter in each chip 702, and the corresponding number of times a given signal from a given chip (at a given wavelength) is split before being received at a given chip, there will be different unique amplitude levels associated with each chip/wavelength.

FIGS. 9A to 9C include tables illustrating exemplary values of power levels of optical signals having various wavelengths as the optical signals pass various numbers of chips. FIG. 9A includes a table 900 that shows an example of the power levels for optical signals of various wavelengths as the optical signals pass various numbers of chips. The values in the table 900 are normalized to a maximum value of 1. The example of FIG. 9A assumes that chip 1 uses wavelength 1 for transmission of optical signals. Similarly, chips 2 to 5 use wavelengths 2 to 5, respectively, for transmission of optical signals. If chip 1 sends an optical signal having a wavelength 1 and an amplitude of 1 to chip 2, the power level of the optical signal having wavelength 1 received at chip 2 is 0.7. If chip 1 sends an optical signal having an amplitude of 1 to chip 3, passing chip 2 along the way, the power level of the optical signal having wavelength 1 received at chip 3 is 0.7*0.7=0.49. If chip 1 sends an optical signal having an amplitude of 1 to chip 4, passing chips 2 and 3 along the way, the power level of the optical signal having wavelength 1 received at chip 4 is $0.7^3$=0.343. If chip 1 sends an optical signal having an amplitude of 1 to chip 5, passing chips 2 to 4 along the way, the power level of the optical signal having wavelength 1 received at chip 5 is $0.7^4$=0.2401. Similarly, if chip 2 sends an optical signal having wavelength 2 and an amplitude of 1 to chip 3, the power level of the optical signal having wavelength 2 received at chip 3 is 0.7. If chip 2 sends an optical signal having an amplitude of 1 to chip 1, passing chips 3 to 5 along the way, the power level of the optical signal with wavelength 2 received at chip 1 is 0.2401.

FIG. 9B is a table 902 that shows the resulting amplitude levels, and normalized amplitude levels (normalized to a maximum amplitude of 1) that result from the mapping of wavelengths (labeled as WL #) received at each of the two receivers (RX0, RX1) at each chip shown in the table 904 of FIG. 9C. Multiple optical signals at different wavelengths from different respective transmitting chips can be detected simultaneously at a single photodetector using this scheme, reducing the total number of photodetectors needed. In this example, chip 1 includes receivers RX0 and RX1. The receiver RX0 detects wavelengths WL3 and WL5, and the receiver RX1 detects wavelengths WL2 and WL4. Chip 2 includes receiver RX0 and RX1, in which the receiver RX0 detects wavelengths WL1 and WL4, and the receiver RX1 detects wavelengths WL3 and WL5. Chip 3 includes receiver RX0 and RX1, in which the receiver RX0 detects wavelengths WL2 and WL5, and the receiver RX1 detects wavelengths WL1 and WL4. Chip 4 includes receiver RX0 and RX1, in which the receiver RX0 detects wavelengths WL1 and WL3, and the receiver RX1 detects wavelengths WL2 and WL5. Chip 5 includes receiver RX0 and RX1, in which the receiver RX0 detects wavelengths WL2 and WL4, and the receiver RX1 detects wavelengths WL1 and WL3.

As shown in FIG. 9B, if the receiver RX0 of chip 1 detects an optical signal having an amplitude of about 1.043, it can be inferred that the received signal is '1' at wavelength WL3 and '1' at wavelength WL5. If the receiver RX0 of chip 1 detects an optical signal having an amplitude of 0.7, it can be inferred that the received signal is '1' at wavelength WL5 and '0' at wavelength WL3. If the receiver RX0 of chip 1 detects an optical signal having an amplitude of 0.343, it can be inferred that the received signal is '1' at wavelength WL3 and '0' at wavelength WL5. If the receiver RX0 of chip 1 detects an optical signal having an amplitude of 0, it can be inferred that the received signal is '0' at wavelength WL3 and '0' at wavelength WL5.

If the receiver RX1 of chip 1 detects an optical signal having an amplitude of about 0.7301, it can be inferred that the received signal is '1' at wavelength WL2 and '1' at wavelength WL4. If the receiver RX1 of chip 1 detects an optical signal having an amplitude of 0.49, it can be inferred that the received signal is '1' at wavelength WL4 and '0' at wavelength WL2. If the receiver RX1 of chip 1 detects an optical signal having an amplitude of 0.2401, it can be inferred that the received signal is '1' at wavelength WL2 and '0' at wavelength WL4. If the receiver RX1 of chip 1 detects an optical signal having an amplitude of 0, it can be inferred that the received signal is '0' at wavelength WL2 and '0' at wavelength WL4. The analog signals detected at the receivers RX0 and RX1 of chips 2 to 5 can be converted to digital values in a similar manner.

Figure 10:
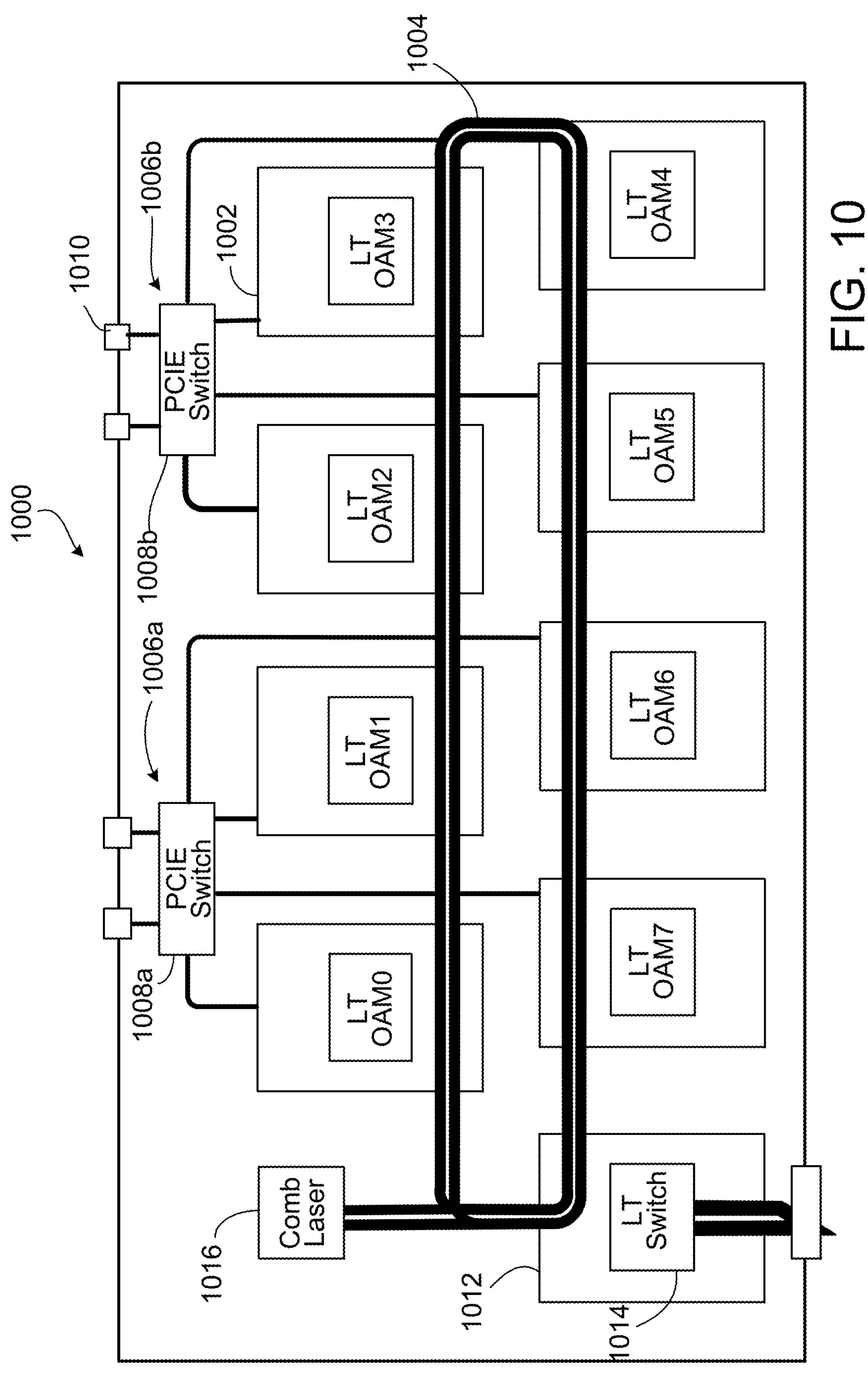
FIG. 10 is a schematic diagram of an example of an optically coupled multi-node computing system.

FIG. 10 shows another example of an optically coupled multi-node computing system 1000. In this example 8 computing nodes 1002 are connected optically by a loop optical network 1004, and electrically, in one of two Peripheral Component Interconnect (PCE) express (PCIE) networks 1006*a*, 1006*b* (collectively referenced as 1006), controlled by respective PCIE switches 1008*a*, 1008*b* (collectively referenced as 1008) that have ports 1010 for connecting to other system(s) (e.g., a host system). There is also a ninth node 1012 with a switch 1014 connected optically in the same loop optical network 1004 to the 8 computing nodes 1002. The loop optical network 1004 can be, for example, a dense wavelength division multiplexed (DWDM) ring network providing all-to-all direct routing among the computing nodes 1002 and the switch node 1012. A laser source 1016 (e.g., a comb laser) can provide light at different wavelengths, which are then modulated by the various nodes 1002. The laser source 1016 sends the laser light to the nodes through waveguides, e.g., similar to the examples shown in FIGS. 7 and 8A (except that the laser source is external to the nodes). Alternatively, in other examples each node 1002, 1012 can include or be coupled to its own laser source.

Figure 11:
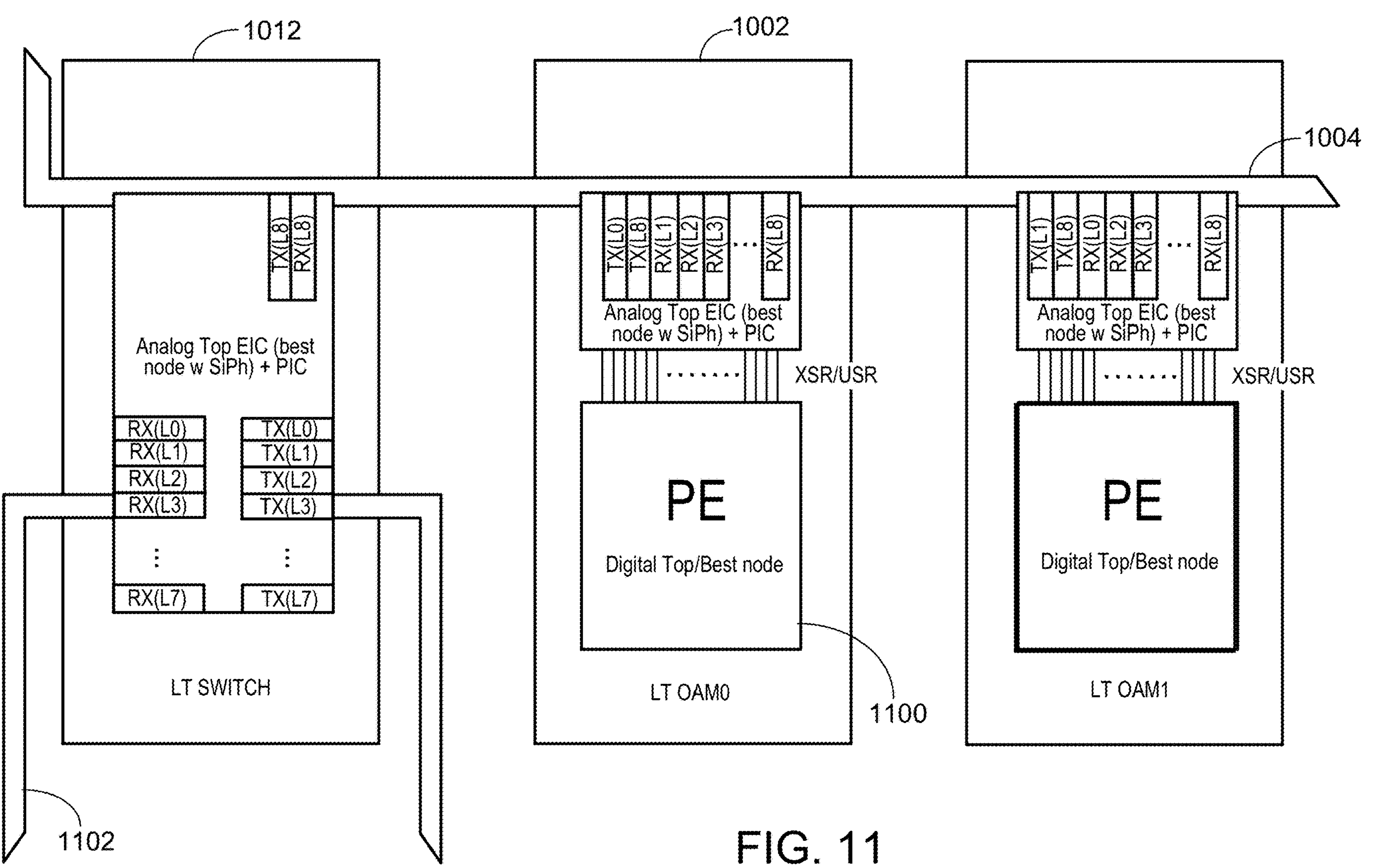
FIG. 11 is a schematic diagram of an interface portion of the optically coupled multi-node computing system.

FIG. 11 shows an example of the optical transmitter (TX) and receiver (RX) interfaces that are included in each node 1002, 1012 for coupling optical signals to and from the loop optical network 1004. In this configuration, each computing node 1002 includes a processing engine (PE) 1100 that is assigned a unique laser wavelength (L #) for transmission to the other computing nodes 1002 and is configured to receive each of the other wavelengths used by the computing nodes 1002. Each computing node 1002 is connected to one TX interface that is used for transmitting on the unique laser wavelength (one of wavelengths L0 to L7) assigned to that computing node 1002. For example, PE 0 is connected to a TX interface that is configured to transmit optical signals having a wavelength L0, PE 1 is connected to a TX interface that is configured to transmit optical signals having a wavelength L1, PE 2 is connected to a TX interface that is configured to transmit optical signals having a wavelength L2, and PE 7 is connected to a TX interface that is configured to transmit optical signals having a wavelength L7. Each processing engine is connected to a TX interface that is configured to transmit optical signals having a common laser wavelength (L8) to the switch node 1012. At any time slot, only one processing engine transmits optical signals having the wavelength L8. The switch node 1012 transmits and receives at the wavelength L8 when communicating with the computing nodes 1002.

The switch node 1012 also includes another set of optical receiver RX and optical transmitter TX interfaces for communicating over a different loop optical network 1102. In this example, there are 8 switch nodes 1012 that are configured such that when the switch nodes 1012 are communicating with other switch nodes 1012 on the loop optical network 1102, each switch node 1012 is configured to transmit on the unique laser wavelength (one of wavelengths L0 to L7) assigned to that switch node 1012. For example, switch node 0 is configured to transmit optical signals having a wavelength L0 on the loop optical network 1102, switch node 1 is configured to transmit optical signals having a wavelength L1 on the loop optical network 1102, switch node 2 is configured to transmit optical signals having a wavelength L2 on the loop optical network 1102, and switch node 7 is configured to transmit optical signals having a wavelength L7 on the loop optical network 1102.

Figure 12:
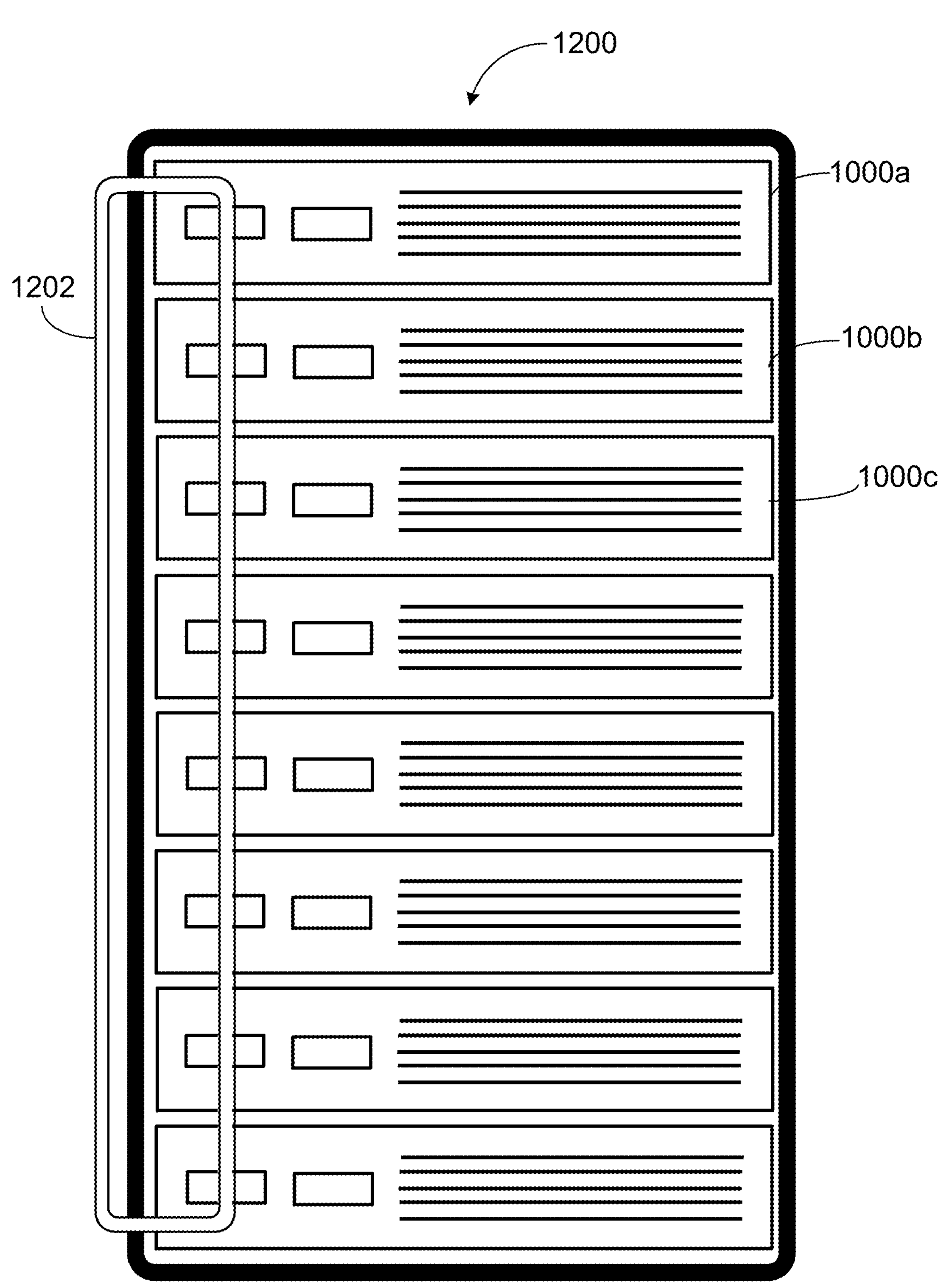
FIG. 12 is a schematic diagram of an example rack optical system.

FIG. 12 shows an example of a rack optical system 1200 that includes a rack of 8 optically coupled multi-node computing systems, e.g., 1000*a*, 1000*b*, 1000*c* (collectively referenced as 1000), in which each system 1000 includes a chassis and is connected via respective switch interfaces in their switch node to another loop optical network 1202 for the rack. For communicating over the loop optical network 1202, each system 1000 includes a switch assigned to a different wavelength of a subset of 8 of the 9 wavelengths. For example, the switch in the system 1000*a* can use wavelength 1 to communicate with other systems 1000 over the loop optical network 1202. Similarly, the switches in the systems 1000*b*, 1000*c* can use wavelengths 1 and 2, respectively, to communicate with the other systems 1000 over the loop optical network 1202. Each computing node 1002 within a system 1000 is 3 hops from any other computing node 1002 in another system 1000 (e.g., node A in system 1 to switch 1 in system 1, switch 1 in system 1 to switch 2 in system 2, switch 2 in system 2 to node B in system 2).

Figure 13:
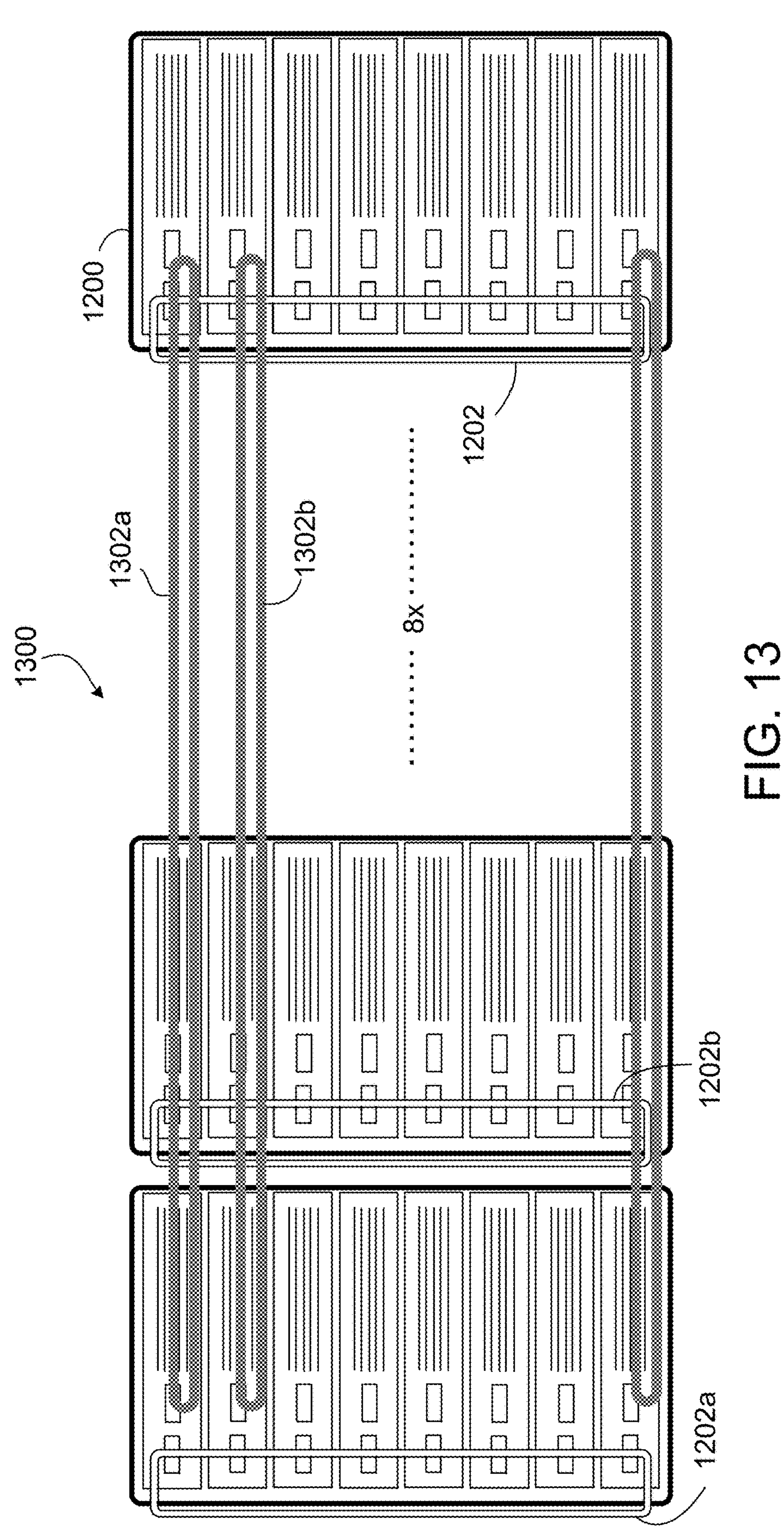
FIG. 13 is a schematic diagram of an example pod optical system.

FIG. 13 shows an example of a pod optical system 1300 that includes 8 rack optical systems, e.g., 1200*a*, 1200*b* (collectively referenced as 1200), in which each rack optical system 1200 includes 8 multi-node computing systems 1000. In this example, the pod optical system 1300 includes 8 rows of multi-node computing systems 1000 and 8 columns of multi-node computing systems 1000. The pod optical system 1300 includes loop optical networks, e.g., 1302*a*, 1302*b* (collectively referenced as 1302) in which each loop optical network 1302 connects the multi-node computing systems 1000 in a row. Each multi-node computing system 1000 is connected via respective switch interfaces in their switch node to the loop optical network 1202 and the loop optical network 1302, allowing a multi-node computing system 1000 to communicate with any other multi-node computing system 1000 in the pod optical system 1300.

Each multi-node computing system 1000 includes a switch node that includes two different sets of switch interfaces for connecting to these additional loop optical networks 1202, 1302. One set of switch interfaces is for connecting to other multi-node computing systems 1000 in the same rack optical system 1200 through the loop optical network 1202, and one set of switch interfaces is for connecting to other multi-node computing systems 1000 in the same row of different rack optical systems 1200.

For communicating over this loop optical network 1302 among each row across the rack optical systems 1200, each rack optical system 1200 has its switch assigned to a different wavelength of a subset of 8 of the 9 wavelengths. Each computing node 1002 within a chassis/rack is 4 hops from any other computing node 1002 in another chassis/rack (e.g., node A in system 1 of rack 1 to switch 1 of system 1 of rack 1, switch 1 of system 1 of rack 1 to switch 2 of system 1 of rack 2, switch 2 of system 1 of rack 2 to switch 3 of system 2 of rack 2, switch 3 of system 2 of rack 2 to node B of system 2 of rack 2).

For example, in rack 1, the switch in system 1 can transmit signals having wavelength 1 to other systems in rack 1 over the loop optical network 1202*a*, the switch in system 2 can transmit signals having wavelength 2 to other systems in rack 1 over the loop optical network 1202*a*, and so forth. The switches in the systems 1000 of rack 1 can use wavelengths 1 to 8 communicate with other systems 1000 in rack 1 over the loop optical network 1202*a*, and use wavelength 9 to communicate with other systems 1000 in racks 2 to 8. In rack 2, the switch in system 1 can transmit signals having wavelength 2 to other systems in rack 2 over the loop optical network 1202*b*, the switch in system 2 can transmit signals having wavelength 3 to other systems in rack 2 over the loop optical network 1202*b*, and so forth. The switches in the systems 1000 of rack 2 can use wavelengths 2 to 9 communicate with other systems 1000 in the same rack over the loop optical network 1202*b*, and use wavelength 1 to communicate with other systems 1000 in racks 1 and 3 to 8. The switches in the systems 1000 of rack 3 can use wavelengths 3 to 9 and 1 communicate with other systems 1000 in rack 3 over the loop optical network 1202*c*, and use wavelength 2 to communicate with other systems 1000 in racks 1, 2, and 4 to 8, and so forth.

In some implementations, multiple optically coupled multi-node computing systems can be formed on multiple respective layers of a substrate to increase the density of the nodes in a given volume. For example, a first optically coupled multi-node computing system can be formed on a first layer or set of layers in the substrate, and a second optically coupled multi-node computing system can be formed on a second layer or set of layers in the substrate. For example, each of the multi-node computing system includes N nodes, so the two multi-node computing systems have a total of 2N nodes. A first node having circuitry in the first layer or set of layers includes transmitter and receiver modules on the second layer or set of layers that allow the first node to communicate with nodes on the second layer or set of layers through the loop optical network in the second layer or set of layers. The circuitry of the first node on the first layer or set of layers is electrically coupled to the transmitter and receiver modules on the second layer or set of layers through vertical contacts, such as vias. This design allows any of the 2N nodes to optically communicate with any of the other 2N nodes through one of the optical networks in the first and second optically coupled multi-node computing systems. In a similar manner, three or more optically coupled multi-node computing systems can be formed on three or more respective layers or sets of layers of a substrate.

In some examples, multiple optically coupled multi-node computing systems can be formed on multiple respective substrates that are stacked vertically to increase the density of the nodes in a given volume. For example, a first optically coupled multi-node computing system can be formed on a first substrate, and a second optically coupled multi-node computing system can be formed on a second substrate. For example, each of the multi-node computing system includes N nodes, so the two multi-node computing systems have a total of 2N nodes. A first node on the first substrate includes transmitter and receiver modules on the second substrate that allow the first node to communicate with nodes on the second substrate through the loop optical network on the second substrate. The circuitry of the first node on the first substrate is electrically coupled to the transmitter and receiver modules on the second substrate through vertical contacts that extend vertically across the first and second substrates. This design allows any of the 2N nodes to optically communicate with any of the other 2N nodes through one of the optical networks in the first and second optically coupled multi-node computing systems. In a similar manner, three or more optically coupled multi-node computing systems can be formed on three or more respective substrates.

In some implementations, multiple optically coupled multi-node computing systems having any of the design shown in FIGS. 1B to 8B can be formed on multiple respective layers or sets of layers in a substrate, or on multiple substrates that are vertically stacked together, or a combination of the above.

The number of nodes and the number of optical loops in a multi-node computing system can be different from the examples described above. For example, it is possible to use n1 horizontal optical loop (having parallel straight waveguide sections extending in the x-direction) and n2 vertical optical loops (having parallel straight waveguide sections extending in the y-direction), in which n1 is different from n2.

Some of the systems, components, and/or functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. An apparatus comprising:

an integrated circuit comprising a plurality of nodes coupled to an optical network, each node comprising:
 an optical transmitter interface configured to transmit an optical signal at a location along a coupled optical path of the optical network, and
 an optical receiver interface configured to receive an optical signal at a location along the coupled optical path of the optical network;

a first optical path of the optical network including at least a portion fabricated in at least one layer of the integrated circuit and configured to propagate a guided mode around a closed path; and a second optical path of the optical network including at least a portion fabricated in at least one layer of the integrated circuit and configured to propagate a guided mode around a closed path;

wherein:
 the first and second optical paths overlap with each other at a first set of four locations on the integrated circuit,
 the first optical path is coupled to two or more of the plurality of nodes at a second set of respective locations on the integrated circuit different from all of the locations in the first set of locations, and
 the second optical path is coupled to two or more of the plurality of nodes at a third set of respective locations on the integrated circuit different from all of the locations in the first and second sets of locations.

2. The apparatus of claim 1, wherein the first optical path comprises at least first and second straight segments that are parallel to each other, with at least one of the plurality of nodes coupled at two or more locations in the second set along the first straight segment and at least one of the plurality of nodes coupled at two or more locations in the second set along the second straight segment.

3. The apparatus of claim 2, wherein the first and second optical paths overlap with each other at the first set of four locations without switching optical signals between the first and second optical paths at any of the four locations in the first set.

4. The apparatus of claim 3, wherein, at at least one of the four locations in the first set, a portion of the first optical path in a first layer of the integrated circuit overlaps with a portion of the second optical path in a second layer of the integrated circuit.

5. The apparatus of claim 4, wherein, at at least one location on the integrated circuit, a portion of the second optical path is in the first layer of the integrated circuit.

6. The apparatus of claim 5, wherein at least one of the plurality of nodes is coupled to the first optical path at one or more locations in the second set of locations and is coupled to the second optical path at one or more locations in the third set of locations.

7. The apparatus of claim 2, wherein the first and second optical paths overlap with each other with at least one switch configured to switch optical signals between the first and second optical paths at at least one of the four locations in the first set.

8. The apparatus of claim 7, wherein the first and second optical paths are fabricated in the same layer of the integrated circuit.

9. The apparatus of claim 8, wherein the switch comprises at least two waveguide ring resonators in proximity to one of the four locations in the first set at which the first and second optical paths overlap with each other.

10. The apparatus of claim 9, further comprising:

a third optical path of the optical network including at least a portion fabricated in at least one layer of the integrated circuit and configured to propagate a guided mode around a closed path; and a fourth optical path of the optical network including at least a portion fabricated in at least one layer of the integrated circuit and configured to propagate a guided mode around a closed path;

wherein:
 the third and fourth optical paths overlap with each other at a fourth set of four locations on the integrated circuit,
 the third optical path is coupled to two or more of the plurality of nodes at a fifth set of respective locations on the integrated circuit different from all of the locations in the first, second, third, and fourth sets of locations, and
 the fourth optical path is coupled to two or more of the plurality of nodes at a sixth set of respective locations on the integrated circuit different from all of the locations in the first, second, third, fourth, and fifth sets of locations.

11. The apparatus of claim 10, wherein the integrated circuit is a first integrated circuit, and the apparatus comprises a second integrated circuit comprising a plurality of nodes coupled to the optical network.

12. The apparatus of claim 11, wherein the first optical path of the optical network includes at least a portion fabricated in at least one layer of the second integrated circuit.

13. An apparatus comprising:

an array of nodes;

an optical network comprising a first optical path and a second optical path, in which the first optical path is configured to propagate a guided mode around a first closed path, the first optical path is optically coupled to a plurality of the nodes in the array, the second optical path is configured to propagate a guided mode around a second closed path, the second optical path optically coupled to a plurality of the nodes in the array, the optical network is configured such that no switch is provided between the first and second optical paths such that an optical signal traveling in the first optical path remains in the first optical path and is not switched to the second optical path, and an optical signal traveling in the second optical path remains in the second optical path and is not switched to the first optical path; and a controller configured to schedule transmission of optical signals among the nodes through the optical network.

14. The apparatus of claim 13 wherein the first optical path is optically coupled to all of the nodes in the array, and the second optical path is optically coupled to all of the nodes in the array.

15. The apparatus of claim 14 in which the controller is configured to set a first node as a transmitter during a first time period, the first node is configured to transmit an optical signal on the first optical path during the first time period, and the controller is configured to prevent the other nodes from transmitting signals on the first optical path during the first time period.

16. The apparatus of claim 15 in which the controller is configured to set a second node as a transmitter during the first time period, the second node is configured to transmit an optical signal on the second optical path during the first time period, and the controller is configured to prevent the other nodes from transmitting signals on the second optical path during the first time period.

17. An apparatus comprising:

an array of nodes;

an optical network comprising a first optical loop and a second optical loop, in which the first optical loop is optically coupled to all of the nodes in the array, the second optical loop is optically coupled to all of the nodes in the array; and a controller configured to schedule transmission of optical signals among the nodes through the optical network, in which the controller is configured to permit only one node to broadcast an optical signal through the first optical loop during a first time period, prevent the other nodes from transmitting optical signals on the first optical loop during the first time period, permit only one node to broadcast an optical signal through the second optical loop during a second time period, and prevent the other nodes from transmitting optical signals on the second optical loop during the second time period.

18. The apparatus of claim 17 in which the controller is configured to schedule a first node and a second node to communicate with each other through the first optical loop during a third time period, schedule a third node and a fourth node to communicate with each other through the second optical loop during the third time period, and prevent the other nodes from transmitting optical signals on the first and second optical loops during the third time period.

19. The apparatus of claim 18 in which no switch is provided between the first and second optical loops such that an optical signal traveling in the first optical loop remains in the first optical loop and is not switched to the second optical loop, and an optical signal traveling in the second optical loop remains in the second optical loop and is not switched to the first optical loop; and transmission of optical signals among the nodes through the optical network.

20. The apparatus of claim 19 in which each node comprises:

an optical transmitter interface configured to transmit an optical signal at a first location along the first or second optical loop, and an optical receiver interface configured to receive an optical signal at a second location along the first or second optical loop;

wherein the first and second optical loops overlap with each other at a first set of four locations, the first optical loop is coupled to two or more of the nodes at a second set of respective locations different from all of the locations in the first set of locations, and the second optical loop is coupled to two or more of the plurality of nodes at a third set of respective locations different from all of the locations in the first and second sets of locations.

* * * * *